(12) United States Patent
Maeda et al.

(10) Patent No.: US 12,234,115 B2
(45) Date of Patent: Feb. 25, 2025

(54) PAPER FEEDING APPARATUS AND IMAGE FORMING APPARATUS

(71) Applicant: FUJIFILM BUSINESS INNOVATION CORP., Tokyo (JP)

(72) Inventors: Shoichi Maeda, Kanagawa (JP); Masahito Niwa, Kanagawa (JP); Yuichi Araki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 793 days.

(21) Appl. No.: 17/154,420

(22) Filed: Jan. 21, 2021

(65) Prior Publication Data

US 2022/0081236 A1 Mar. 17, 2022

(30) Foreign Application Priority Data

Sep. 11, 2020 (JP) ................. 2020-153305

(51) Int. Cl.
| | |
|---|---|
| *B65H 3/48* | (2006.01) |
| *B65H 3/08* | (2006.01) |
| *B65H 3/12* | (2006.01) |
| *B65H 3/14* | (2006.01) |
| *B65H 7/02* | (2006.01) |
| *H04N 1/00* | (2006.01) |

(52) U.S. Cl.
CPC ............ *B65H 3/48* (2013.01); *B65H 3/0816* (2013.01); *B65H 3/128* (2013.01); *B65H 3/14* (2013.01); *B65H 7/02* (2013.01); *H04N 1/00615* (2013.01); *B65H 2511/10* (2013.01); *B65H 2515/20* (2013.01); *B65H 2515/805* (2013.01); *B65H 2515/83* (2013.01); *B65H 2801/06* (2013.01)

(58) Field of Classification Search
CPC ...... B65H 3/14; B65H 3/48; B65H 2515/805; H04N 1/00615
See application file for complete search history.

(56) References Cited

U.S. PATENT DOCUMENTS

| | | | | |
|---|---|---|---|---|
| 6,955,348 | B2 * | 10/2005 | Koga ................. | B65H 3/48 271/97 |
| 7,748,698 | B2 * | 7/2010 | Shelhart ............. | B65H 3/48 271/97 |
| 11,479,424 | B2 * | 10/2022 | Araki ................. | B65H 7/02 |
| 2016/0016740 | A1 | 1/2016 | Niikura et al. | |
| 2021/0024309 | A1 * | 1/2021 | Zhou ................. | B65H 7/16 |

FOREIGN PATENT DOCUMENTS

JP   2016-000653 A   1/2016

* cited by examiner

*Primary Examiner* — Jeremy R Severson
(74) *Attorney, Agent, or Firm* — Oliff PLC

(57) ABSTRACT

A paper feeding apparatus includes: a paper feeder configured to feed out the uppermost paper included in a paper bundle; a blower configured to blow gas to a lateral side of the paper bundle; and a processor configured to reduce an amount of the gas blown to the lateral side when a predetermined specific condition is satisfied.

9 Claims, 17 Drawing Sheets

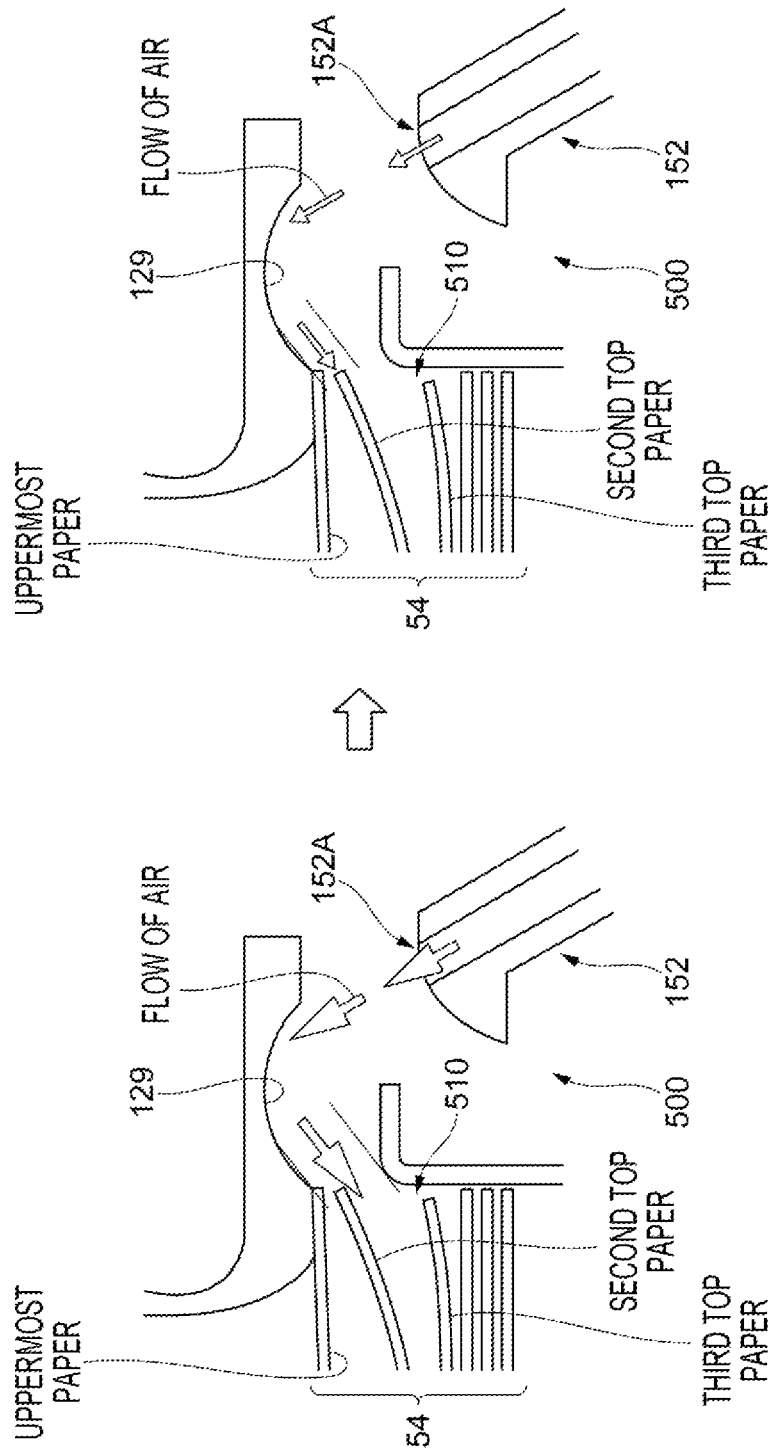

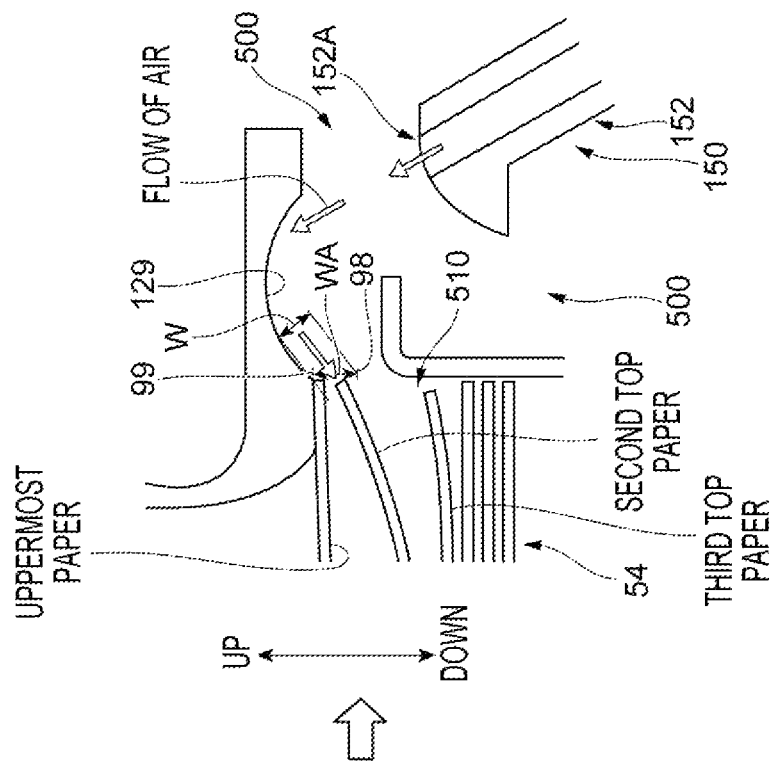
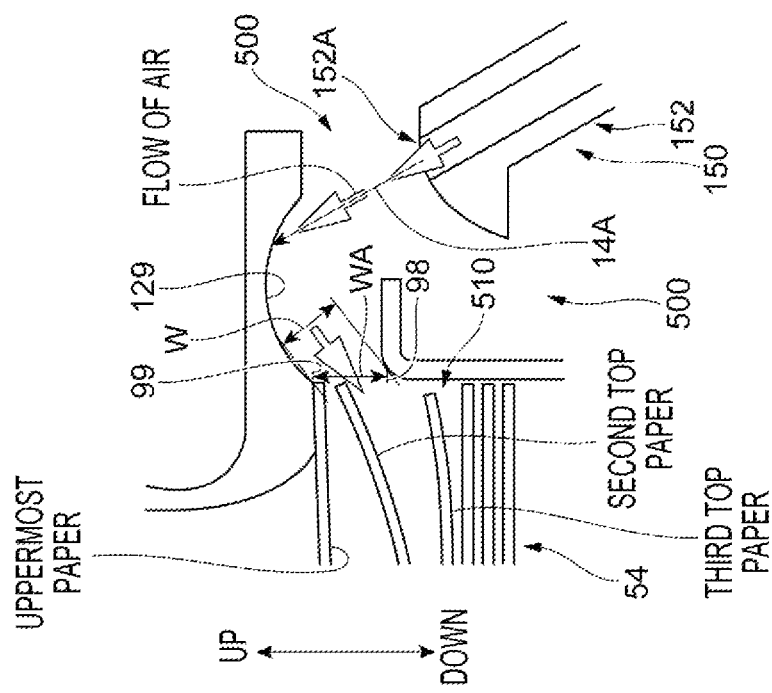

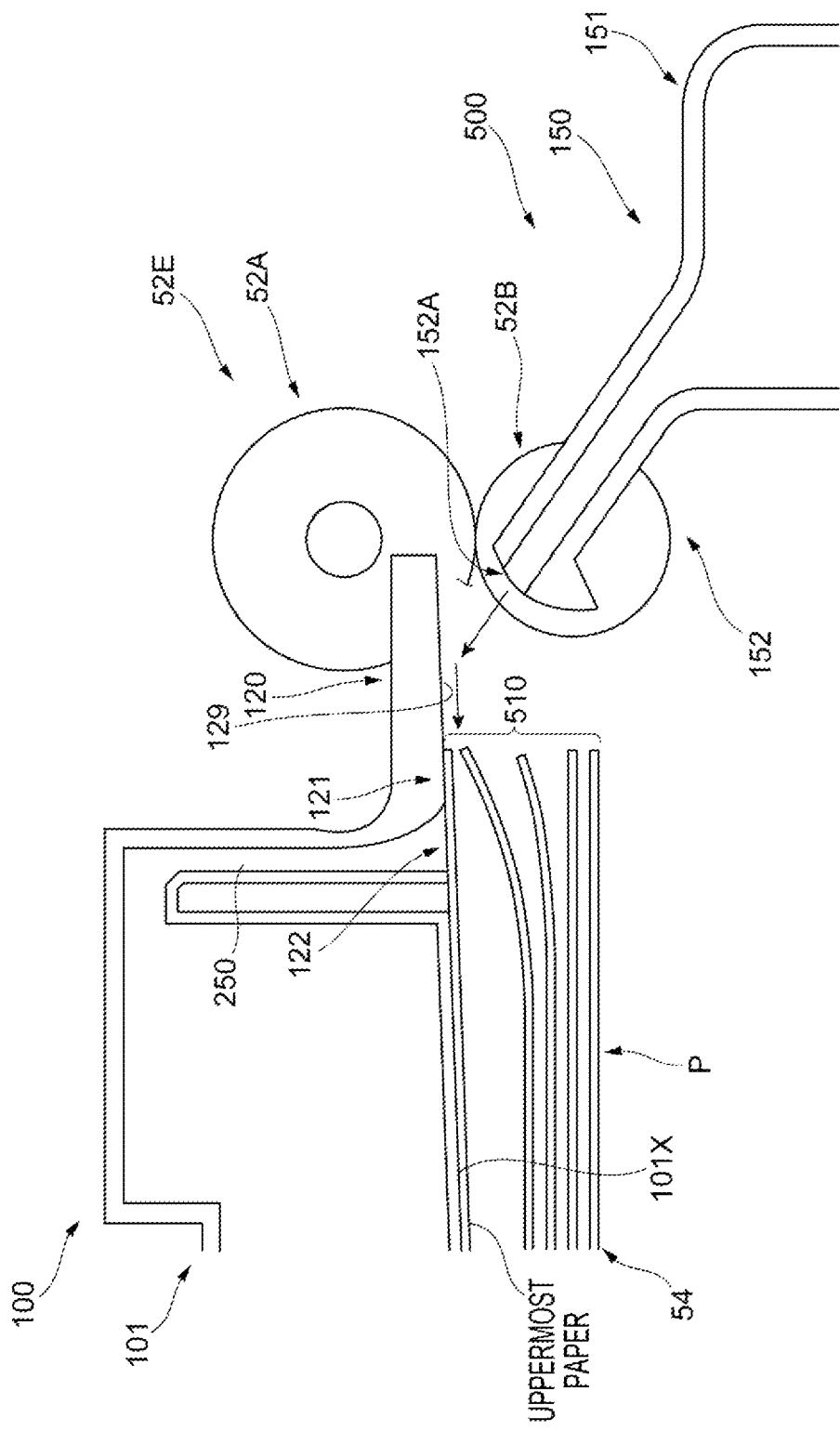

PAPER FEEDING APPARATUS AND IMAGE FORMING APPARATUS

CROSS-REFERENCE TO RELATED APPLICATIONS

This application is based on and claims priority under 35 USC 119 from Japanese Patent Application No. 2020-153305 filed Sep. 11, 2020.

BACKGROUND

(i) Technical Field

The present disclosure relates to a paper feeding apparatus and an image forming apparatus.

(ii) Related Art

JP-A-2016-000653 discloses a paper feeding apparatus which includes a housing, a paper feed tray that is provided with a loading plate on which papers are loaded and is slidable inside/outside the housing, and a transport unit that transports a paper loaded on the loading plate in a direction perpendicular to both of the sliding direction of the paper feed tray and the loading direction of the papers.

SUMMARY

When a paper is fed out from a paper bundle, gas may be blown from sides of the paper bundle, in order to prevent a paper below the uppermost paper from adhering to the uppermost paper.

Here, according to conditions for blowing the gas, there may occur a situation where a paper below the uppermost paper adheres to the uppermost paper, and is transported together with the uppermost paper.

Aspects of non-limiting embodiments of the present disclosure relate to preventing the occurrence of a situation where plural papers are fed out in a stacked state, as compared with a case where gas is blown to a paper bundle under one fixed condition for blowing the gas to the paper bundle without changing the conditions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a paper feeding apparatus including: a paper feeder configured to feed out the uppermost paper included in a paper bundle; a blower configured to blow gas to a lateral side of the paper bundle; and a processor configured to reduce an amount of the gas blown to the lateral side when a predetermined specific condition is satisfied.

BRIEF DESCRIPTION OF THE DRAWINGS

Exemplary embodiment(s) of the present disclosure will be described in detail based on the following figures, wherein:

FIGS. 13A and 13B are views illustrating a state of the paper bundle when air is blown;

FIGS. 14A and 14B are views illustrating a blowing target area;

FIG. 17 is a view illustrating another example of a configuration of a guide surface.

DETAILED DESCRIPTION

Hereinafter, exemplary embodiments of the present disclosure will be described with reference to the accompanying drawings.

Figure 1:
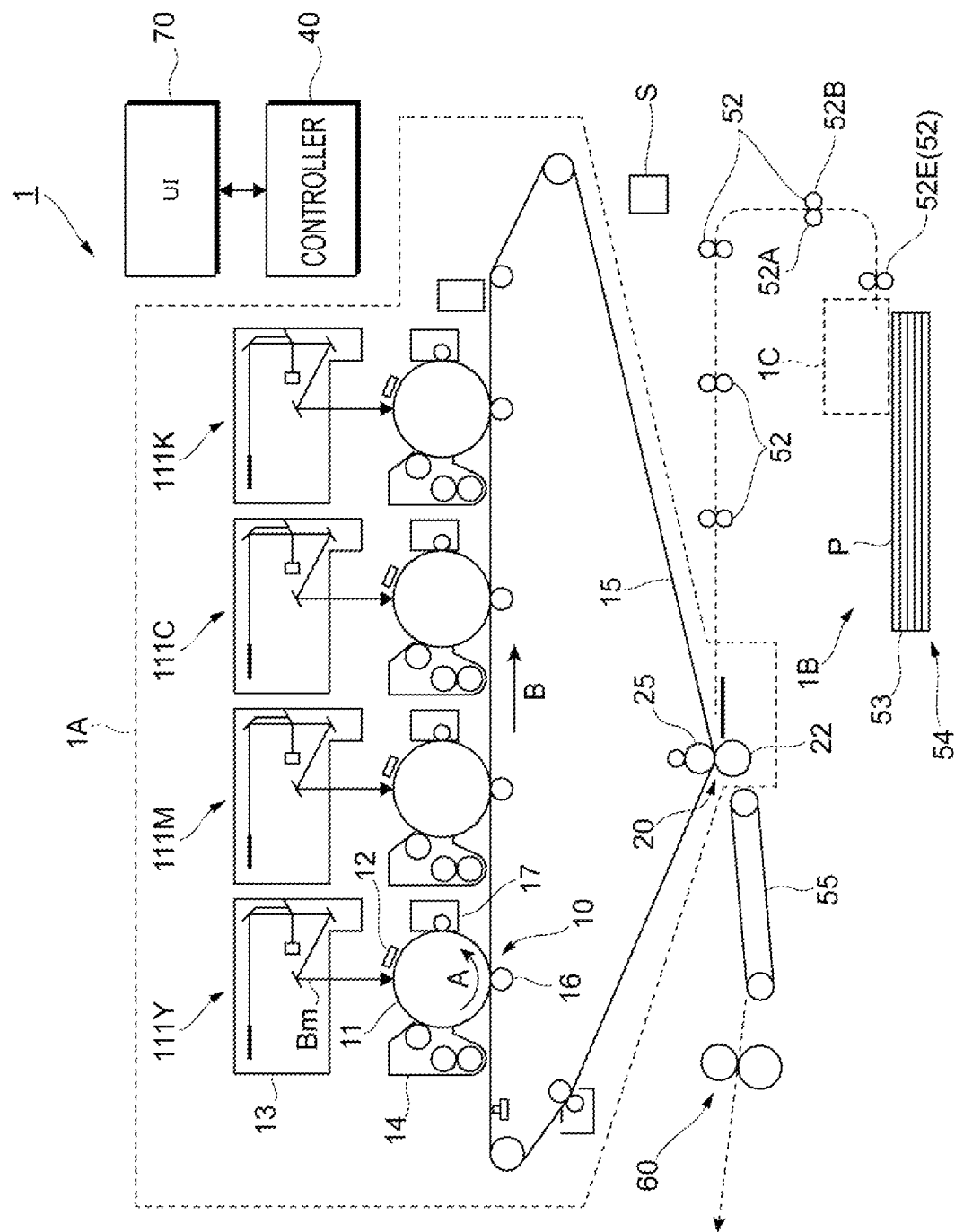
FIG. 1 is a schematic configuration view illustrating an image forming apparatus.

FIG. 1 is a schematic configuration view illustrating an image forming apparatus 1 according to an exemplary embodiment of the present disclosure.

The image forming apparatus 1 illustrated in FIG. 1 is an intermediate transfer type image forming apparatus 1 which is called a tandem type image forming apparatus. In the image forming apparatus 1, an image forming unit 1A forms an image on a paper P which is an example of a recording material. Further, a paper feeding apparatus 1B feeds out papers P loaded on a paper loading unit 53 one by one.

Further, an environment sensor S is provided inside the image forming apparatus 1 to acquire information on the internal environment of the image forming apparatus 1. The environment sensor S acquires information on a temperature or humidity inside the image forming apparatus 1.

In the image forming unit 1A which is an example of an image forming unit, plural image forming units 111Y, 111M, 111C, and 111K form toner images of their respective color components by an electrophotographic method.

Further, in the image forming unit 1A, a primary transfer unit 10 transfers the toner images of the color components formed by the image forming units 111Y, 111M, 111C, and 111K, respectively, one by one onto an intermediate transfer belt 15 (primary transfer).

Further, in the image forming unit 1A, a secondary transfer unit 20 collectively transfers the superimposed toner images that have been transferred onto the intermediate transfer belt 15, onto a paper P (secondary transfer).

Further, in the image forming apparatus 1, a fixing device 60 fixes the toner image secondarily transferred onto the paper P, to the paper P.

Further, a controller 40 controls an operation of each device (unit). Further, a UI (user interface) 70 implemented by a display panel or the like not only receives information from a user but also displays information on the user.

Figure 11:
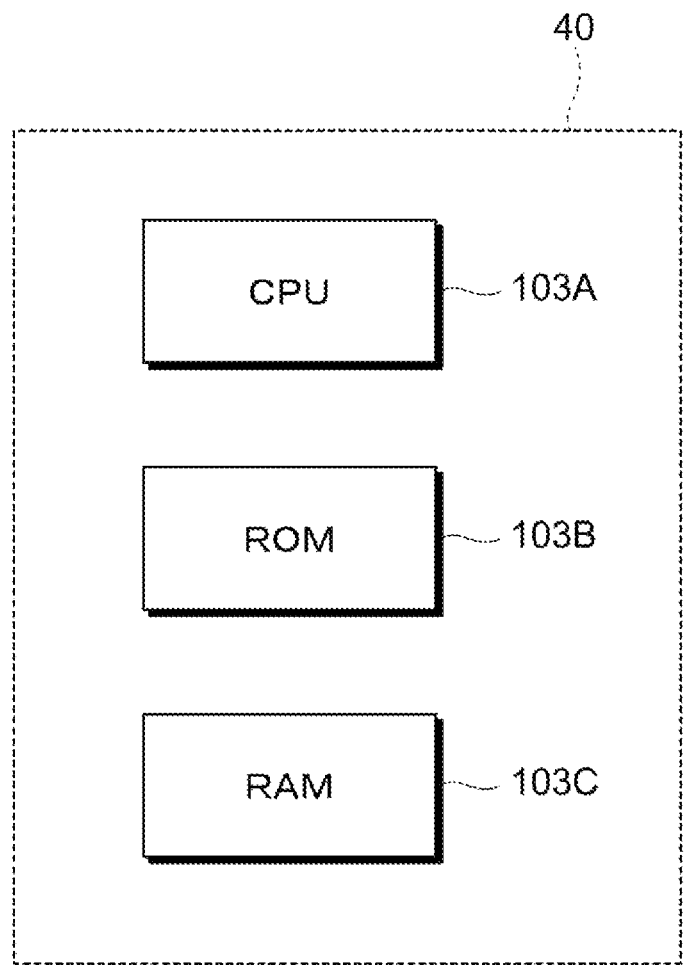
FIG. 11 is a view illustrating a configuration of a controller.

FIG. 11 is a view illustrating a configuration of the controller 40.

The controller 40 includes a CPU (central processing unit) 103A, a ROM (read only memory) 103B, and a RAM (random access memory) 103C.

The ROM 103B stores a program which is executed by the CPU 103A. The CPU 103A which is an example of a processor reads the program stored in the ROM 103B, and executes the program by using the RAM 103C as a work area.

Here, the program to be executed by the CPU 103A may be provided to the controller 40 in a state of being stored in a computer-readable recording medium such as a magnetic recording medium (for example, a magnetic tape or a magnetic disk), an optical recording medium (for example, an optical disc), an optical magnetic recording medium or a semiconductor memory.

Further, the program to be executed by the CPU 103A may be downloaded to the controller 40 by using a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The image forming apparatus 1 will be further described with reference to FIG. 1.

Each of the image forming units 111Y, 111M, 111C, and 111K is provided with the following devices.

First, a charger 12 is provided around each photoconductor drum 11 that rotates in the direction of the arrow "A", to charge the photoconductor drum 11. Further, an exposure device 13 records an electrostatic latent image on the photoconductor drum 11. Further, a developing device 14 develops the electrostatic latent image on the photoconductor drum 11 with toners.

Further, in each of the image forming units 111Y, 111M, 111C, and 111K, a primary transfer roller 16 transfers a toner image of each color component formed on the photoconductor drum 11, onto the intermediate transfer belt 15 in the primary transfer unit 10.

Further, in each of the image forming units 111Y, 111M, 111C, and 111K, a drum cleaner 17 removes a residual toner or the like on the photoconductor drum 11.

The intermediate transfer belt 15 circularly moves in the direction of the arrow B illustrated in FIG. 1 at a predetermined speed.

The primary transfer unit 10 includes the primary transfer roller 16 disposed facing the photoconductor drum 11 with the intermediate transfer belt 15 interposed between the primary transfer roller 16 and the photoconductor drum 11.

In the present exemplary embodiment, the toner image on each photoconductor drum 11 is electrostatically attracted to the intermediate transfer belt 15 one by one, and a superimposed toner image is formed on the intermediate transfer belt 15.

The secondary transfer unit 20 includes a secondary transfer roller 22 disposed facing the outer peripheral surface of the intermediate transfer belt 15, and a backup roller 25.

The secondary transfer roller 22 is in a pressure contact with the backup roller 25, with the intermediate transfer belt 15 interposed between the rollers 22 and 25. Further, a voltage is applied between the secondary transfer roller 22 and the backup roller 25, and the toner images are secondarily transferred onto a paper P transported to the secondary transfer unit 20.

In the present exemplary embodiment, image data is output from an image reading device (not illustrated), a personal computer (PC) or the like to the image forming apparatus 1.

Then, the image data is subjected to an image processing performed by an image processing apparatus (not illustrated), so as to generate image data in the four colors of Y, M, C, and K, and the generated image data are output to the exposure devices 13 provided for the colors Y, M, C, and K, respectively.

The exposure devices 13 irradiate the photoconductor drums 11 of the image forming units 111Y, 111M, 111C, and 111K, respectively, with exposure beams Bm emitted from, for example, a semiconductor laser based on the input image data.

The surface of each photoconductor drum 11 is charged by the charger 12, and then, scanned/exposed by the corresponding exposure device 13 so that an electrostatic latent image is formed on the surface of the photoconductor drum 11.

Then, after toner images are formed on the photoconductor drum 11 by the developing device 14, the toner images are transferred onto the intermediate transfer belt 15 in the primary transfer unit 10 in which each photoconductor drum 11 and the intermediate transfer belt 15 are in contact with each other.

After the toner images are primarily transferred onto the surface of the intermediate transfer belt 15 one by one, the toner images are transported to the secondary transfer unit 20 by the movement of the intermediate transfer belt 15.

In the secondary transfer unit 20, the secondary transfer roller 22 is pressed against the backup roller 25 via the intermediate transfer belt 15. A paper P that has been transported from the paper loading unit 53 is sandwiched between the intermediate transfer belt 15 and the secondary transfer roller 22.

As a result, the unfixed toner images held/supported on the intermediate transfer belt 15 are collectively transferred onto the paper P in the secondary transfer unit 20.

Then, the paper P onto which the toner images have been transferred passes through the fixing device 60, and is ejected to a paper ejection unit (not illustrated).

In the paper feeding apparatus 1B, a paper feed-out unit 1C feeds out the uppermost paper P among papers P loaded on the paper loading unit 53. In other words, in the paper feeding apparatus 1B, the paper feed-out unit 1C feeds out the uppermost paper included in a paper bundle 54.

Further, in the present exemplary embodiment, plural transport rollers 52 transport the paper P fed out by the paper feed-out unit 1C.

Each transport roller 52 includes a driving roller 52A that rotates by a driving force from a motor (not illustrated), and a driven roller 52B that is disposed in contact with the driving roller 52A and rotates by the driving force from the driving roller 52A.

In the present exemplary embodiment, first, the paper P fed out by the paper feed-out unit 1C is transported by the transport roller 52 disposed most upstream in the transport direction of the paper P (hereinafter, referred to as a "most-upstream transport roller 52E") among the plural transport rollers 52.

Then, the paper P is further transported by other transport rollers 52 disposed downstream relative to the most-upstream transport roller 52E, and goes toward the secondary transfer unit 20 and the fixing device 60.

Further, in the present exemplary embodiment, a transport belt 55 is provided.

The transport belt 55 is provided downstream relative to the secondary transfer roller 22 in the transport direction of the paper P, and transports the paper P that has been subjected to the secondary transfer to the fixing device 60.

FIGS. 2A to 2D are views illustrating the paper feed-out unit 1C. FIG. 3 is a perspective view of a suction unit 100 (to be described later) when viewed in the direction of the arrow III of FIG. 2A.

Figure 2A:
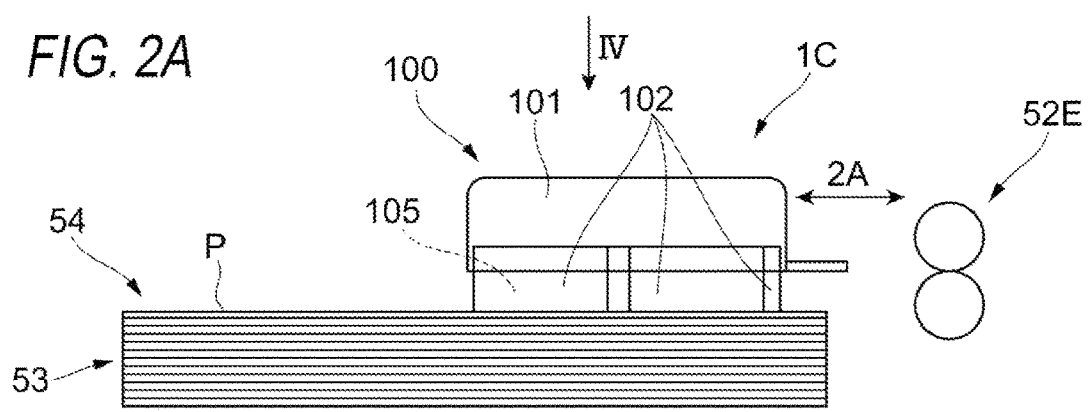
FIGS. 2A to 2D are views illustrating a paper feed-out unit.
Figure 3:
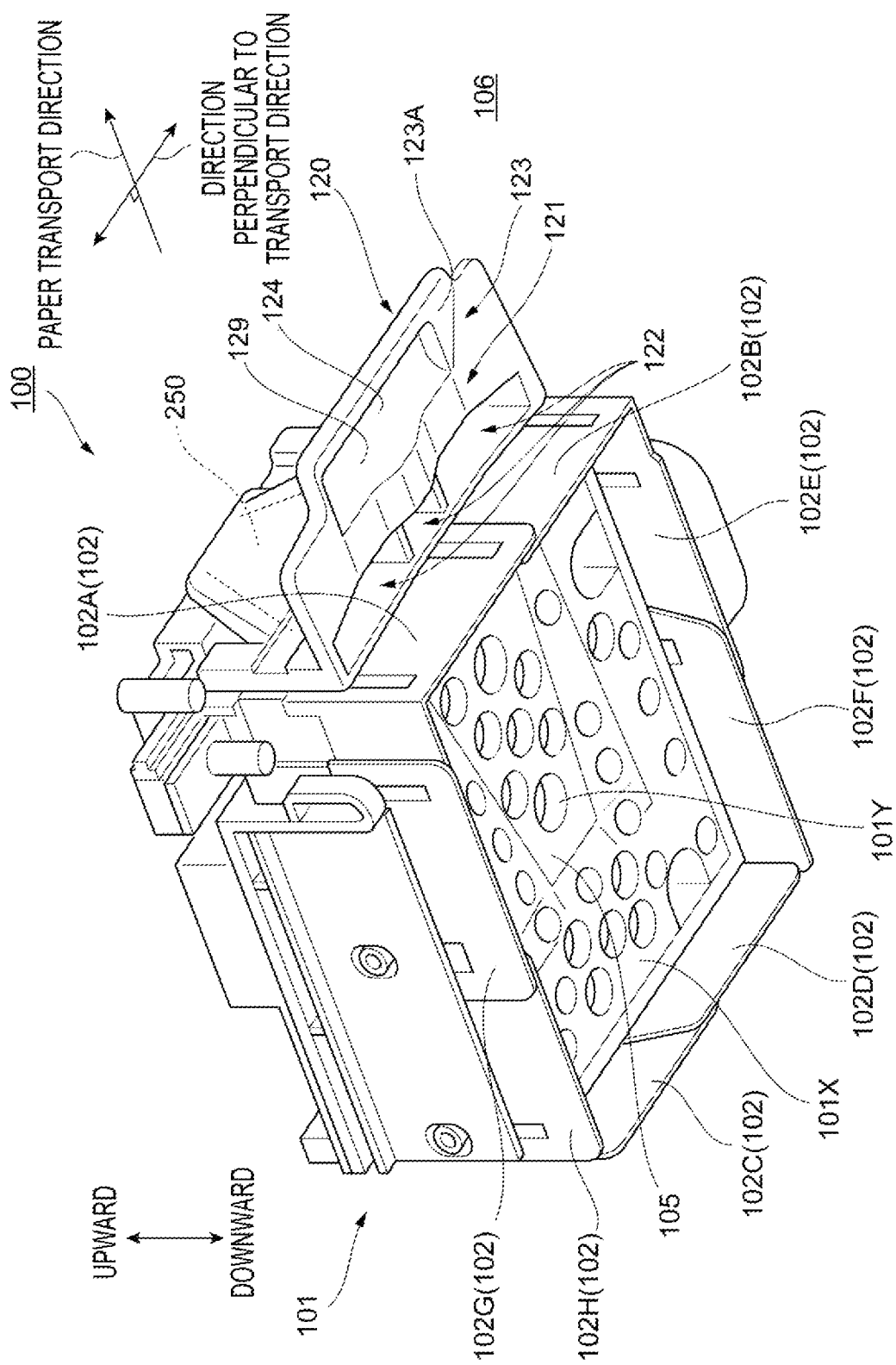
FIG. 3 is a perspective view of a suction unit when viewed from a direction of arrow III in FIG. 2A.

As illustrated in FIG. 2A, in the paper feed-out unit 1C which is an example of a paper feeder, the suction unit 100 suctions a paper P loaded on the paper loading unit 53. Further, a moving mechanism (not illustrated) moves the suction unit 100 in the direction of the arrow 2A of FIG. 2A.

Here, the moving mechanism is implemented by a known mechanism such as a motor, a gear, a rack, a pinion, a belt drive or the like, and is not limited to a particular mechanism.

In the present exemplary embodiment, the suction unit 100 moves by the moving mechanism in the direction toward the most-upstream transport roller 52E and in the direction away from the most-upstream transport roller 52E, as indicated by the arrow 2A.

Additionally, in the present exemplary embodiment, the suction unit 100 moves by the moving mechanism in the direction toward the most-upstream transport roller 52E, from above the paper bundle 54. Further, in the present exemplary embodiment, the suction unit 100 that has moved toward the most-upstream transport roller 52E moves toward the paper bundle 54 and comes back above the paper bundle 54 by the moving mechanism.

As illustrated in FIG. 2A, the suction unit 100 is provided with an apparatus body 101 having a rectangular parallelepiped shape, and plural moving members 102 provided in a state of hanging down from the apparatus body 101.

A suction tube (not illustrated) is connected to the apparatus body 101, and in the present exemplary embodiment, a paper P is suctioned by the apparatus body 101 as described later.

Each moving member 102 is formed in a plate shape, and is movable up and down.

As illustrated in FIG. 3, in the present exemplary embodiment, the moving members 102 include a first leading end moving member 102A, a second leading end moving member 102B, a first trailing end moving member 102C, a second trailing end moving member 102D, a first right moving member 102E, a second right moving member 102F, a first left moving member 102G, and a second left moving member 102H.

In the present exemplary embodiment, the eight moving members 102 partition a rectangular-parallelepiped decompressed space 105 below the apparatus body 101 and an atmospheric pressure space 106 around the decompressed space 105, from each other.

In the present exemplary embodiment, the rectangular-parallelepiped space surrounded by the eight moving members 102 serves as the decompressed space 105. Further, the space disposed outside the decompressed space 105 serves as the atmospheric pressure space 106 which is brought into an atmospheric pressure state.

Plural holes 101Y are formed in the lower surface 101X of the apparatus body 101, and the air in the decompressed space 105 is suctioned through the holes 101Y. As a result, the pressure in the decompressed space 105 becomes smaller than the atmospheric pressure.

Figure 2B:
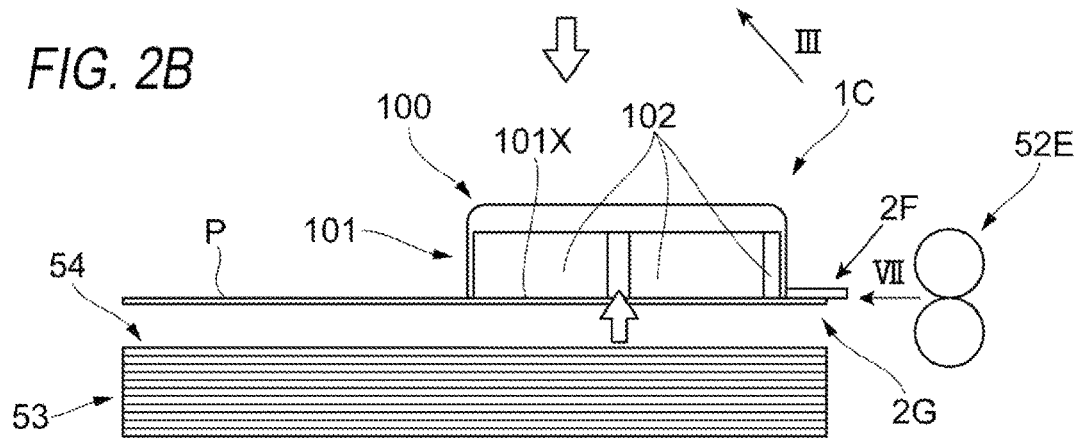

When the air in the decompressed space 105 is suctioned so that the pressure in the decompressed space 105 becomes small, as illustrated in FIGS. 2A and 2B, a paper P placed below the decompressed space 105 is suctioned and moves toward the lower surface 101X of the apparatus body 101 (see FIG. 2B).

Then, the paper P adheres to the lower surface 101X which is an example of an adsorption portion. In other words, in the present exemplary embodiment, the paper P is adsorbed to the lower surface 101X. More specifically, in the present exemplary embodiment, the paper P is adsorbed to the lower surface 101X from below.

Here, the lower surface 101X which is an example of the adsorption portion is planar, and in the present exemplary embodiment, the adsorption portion has a plane shape, and the paper P is adsorbed to the planar adsorption portion. In other words, in the present exemplary embodiment, the paper P is adsorbed to an adsorption surface.

In the present exemplary embodiment, when the paper P is adsorbed to the lower surface 101X of the apparatus body 101, the eight moving members 102 illustrated in FIG. 3 move upward from the state illustrated in FIG. 2A, and are brought into the state illustrated in FIG. 2B.

Additionally, in the present exemplary embodiment, when the paper P is adsorbed to the lower surface 101X illustrated in FIG. 3, the eight moving members 102 are pressed from below by the papers P placed below the lower surface 101X, and move upward. Then, when the eight moving members 102 move upward, a paper P is adsorbed to the lower surface 101X of the apparatus body 101.

Further, in the present exemplary embodiment, in a state where the paper P is adsorbed to the lower surface 101X, air is blown to an edge portion 2G of the paper P adsorbed to the lower surface 101X from above the lower surface 101X, as indicated by the arrow 2F of FIG. 2B.

Additionally, in the present exemplary embodiment, air is blown to the edge portion 2G of the paper P adsorbed to the lower surface 101X, from above the edge portion 2G.

More specifically, in the present exemplary embodiment, the edge portion 2G illustrated in FIG. 2B is an edge portion positioned at the leading end of the paper P when the paper P is transported (hereinafter, referred to as the "leading edge portion 2G"). In the present exemplary embodiment, air is blown to the leading edge portion 2G from above.

In the present exemplary embodiment, a case where air is blown to the leading edge portion 2G is described as an example. However, air may be blown to an edge portion other than the leading edge portion 2G, from above.

Figure 2C:
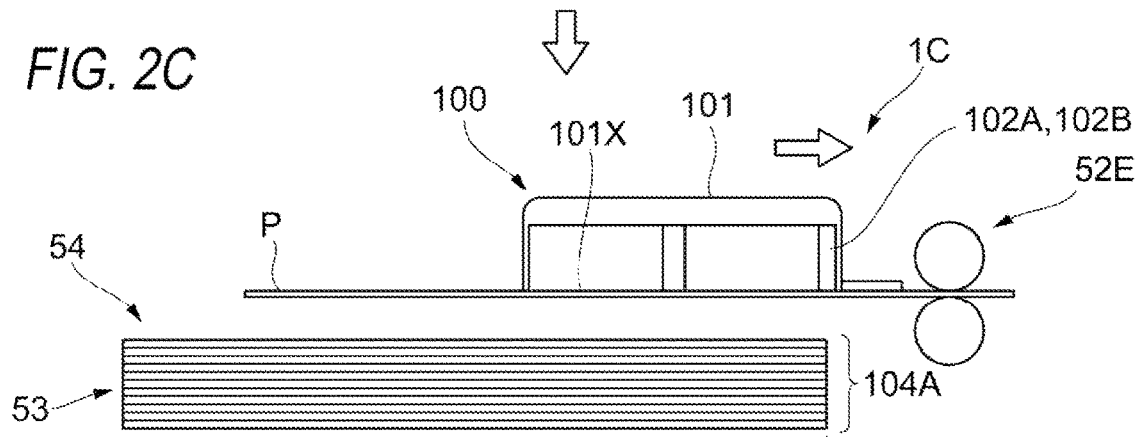

Then, in the present exemplary embodiment, as illustrated in FIG. 2C, the suction unit 100 moves toward the most-upstream transport roller 52E, and the paper P adsorbed to the lower surface 101X of the apparatus body 101 is supplied to the most-upstream transport roller 52E.

As a result, the transport of the paper P by the most-upstream transport roller 52E starts.

Additionally, in the present exemplary embodiment, the suction unit 100 moves in the direction intersecting the vertical direction toward the most-upstream transport roller 52E.

As a result, the paper P that adheres to the lower surface 101X of the apparatus body 101 is supplied to the most-upstream transport roller 52E, and the transport of the paper P by the most-upstream transfer roller 52E starts.

In other words, the uppermost paper P included in the paper bundle 54 is fed out toward the most-upstream transfer roller 52E, and the transport of the paper P by the most-upstream transport roller 52E starts.

Figure 2D:
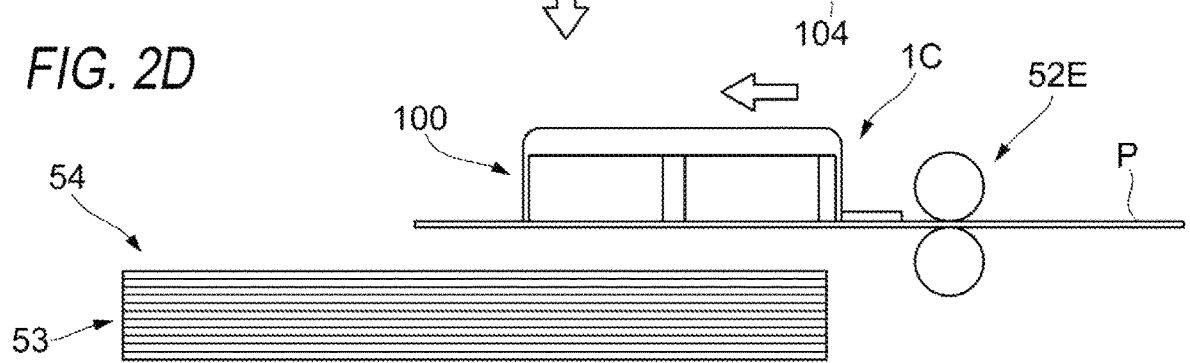

Then, in the present exemplary embodiment, as illustrated in FIG. 2D, the suction unit 100 comes back toward the paper bundle 54, and is brought into a state of being positioned again above the paper bundle 54.

Figure 4:
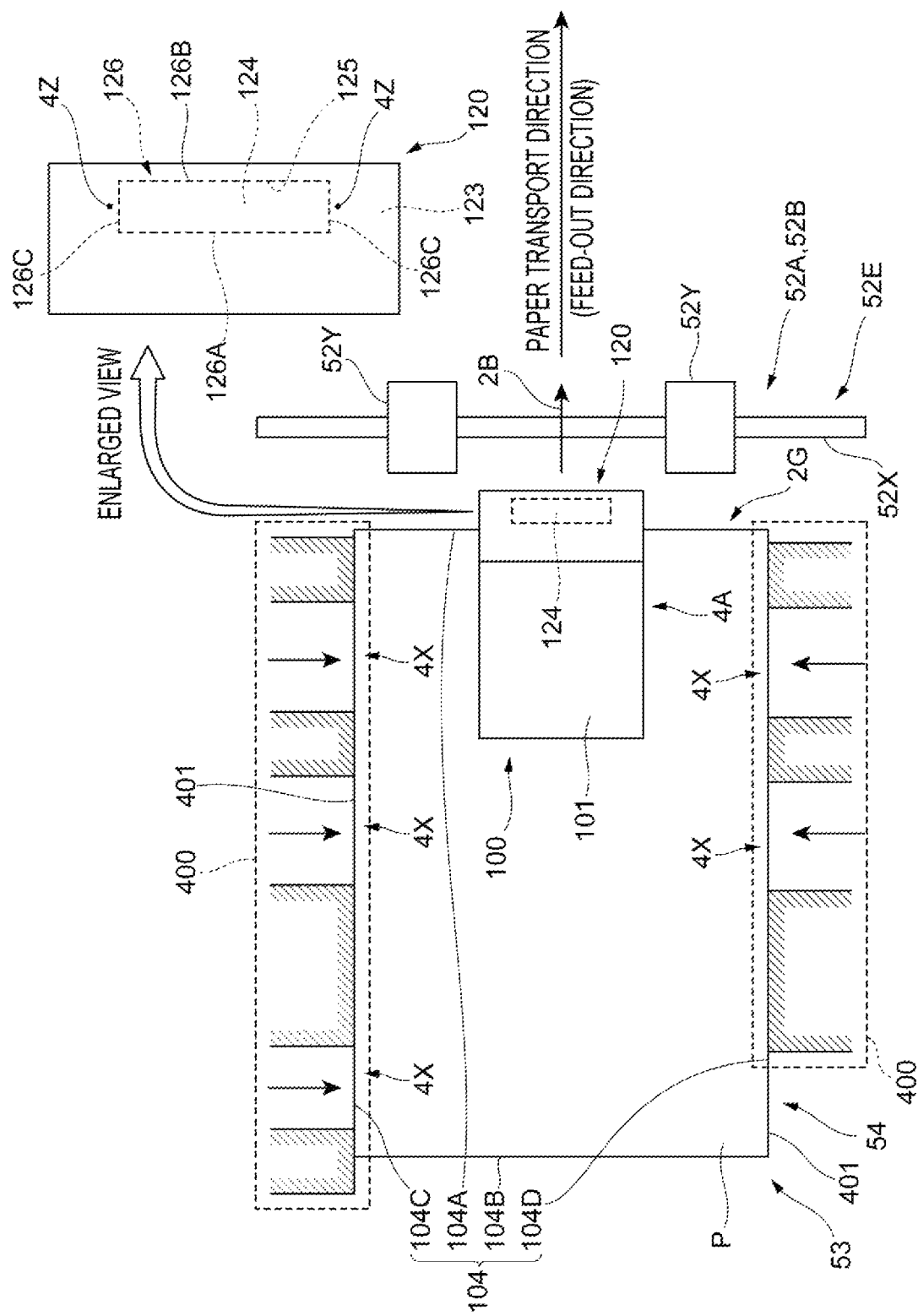
FIG. 4 is a view of a paper loading unit and others when viewed from a direction of arrow IV in FIG. 2A.

FIG. 4 is a view of the paper loading unit 53 and others when viewed from the direction of the arrow IV in FIG. 2A. Additionally, FIG. 4 is a view of the paper loading unit 53 and others when viewed from above.

As illustrated in FIG. 4, in the present exemplary embodiment, the paper bundle 54 is placed on the paper loading unit 53, in which the plural papers P are arranged in the thickness direction of the papers P. The paper bundle 54 and each paper P included in the paper bundle 54 have a rectangular outer peripheral edge 104.

The rectangular outer peripheral edge 104 is made up by a leading end outer peripheral edge 104A, a trailing end outer peripheral edge 104B, a first lateral side outer peripheral edge 104C, and a second lateral side outer peripheral edge 104D.

The leading end outer peripheral edge 104A is the outer peripheral edge 104 disposed most downstream in the transport direction of the paper P. The leading end outer peripheral edge 104A extends along the direction intersecting (perpendicular to) the transport direction of the paper P.

The trailing end outer peripheral edge 104B is the outer peripheral edge 104 disposed most upstream in the transport direction of the paper P. The trailing end outer peripheral edge 104B also extends along the direction intersecting (perpendicular to) the transport direction of the paper P.

The first lateral side outer peripheral edge 104C is the outer peripheral edge 104 that connects one end of the leading end outer peripheral edge 104A and one end of the trailing end outer peripheral edge 104B to each other. The first lateral side outer peripheral edge 104C extends along the transport direction of the paper P.

The second lateral side outer peripheral edge 104D is the outer peripheral edge 104 that connects the other end of the leading end outer peripheral edge 104A and the other end of the trailing end outer peripheral edge 104B to each other. The second lateral side outer peripheral edge 104D also extends along the transport direction of the paper P.

Here, when the suctioning of the paper P is performed, the apparatus body 101 of the suction unit 100 is positioned inside the outer peripheral edge 104 of the paper bundle 54, as indicated by the reference numeral 4A in FIG. 4.

Then, when the paper P is supplied to the most-upstream transport roller 52E, the suction unit 100 moves toward the most-upstream transport roller 52E as indicated by the arrow 2B.

In the present exemplary embodiment, as illustrated in FIG. 4, plural openings 4X are provided at the sides of the paper bundle 54, and in the present exemplary embodiment, air is sent from the openings 4X toward the paper bundle 54 so that blowing of air from the sides of the paper bundle 54 is performed.

In the present exemplary embodiment, lateral side blowing mechanisms 400 are provided at the sides of the paper bundle 54, as an example of a blower that blows air to the lateral sides of the paper bundle 54.

Each lateral side blowing mechanism 400 includes an air supply source (not illustrated) such as a fan. Further, the lateral side blowing mechanism 400 has the openings 4X, and air which is an example of gas is blown from the openings 4X to the lateral sides of the paper bundle 54 in the direction perpendicular to the feed-out direction of the paper P (hereinafter, each referred to as the "perpendicular lateral side 401").

Further, in the present exemplary embodiment, each of the driving roller 52A and the driven roller 52B provided in the most-upstream transport roller 52E includes a rotary shaft 52X and plural tubular members 52Y provided around the rotary shaft 52X.

In the present exemplary embodiment, the suction unit 100 is configured such that when the suction unit 100 moves toward the most-upstream transport roller 52E, the suction unit 100 enters between the two tubular members 52Y, which causes no interference between the suction unit 100 and the most-upstream transport roller 52E.

The configuration of the suction unit 100 will be further described referring back to FIG. 3.

As described above, the suction unit 100 is provided with the apparatus body 101. In the apparatus body 101, an air guide member 120 guides air.

In the air guide member 120, an uneven portion 121 imparts a shape of waveform to the leading edge portion 2G of the paper P (see FIG. 2B).

The uneven portion 121 is disposed to extend in the direction perpendicular to the transport direction of the paper P. Additionally, the uneven portion 121 is disposed to extend along the leading edge portion 2G of the paper P.

In the present exemplary embodiment, when the paper P is brought into a state of being adsorbed to the lower surface 101X of the apparatus body 101, the leading edge portion 2G of the paper P is pressed against the uneven portion 121, and the shape of waveform is imparted to the leading edge portion 2G.

Further, in the air guide member 120, a suction opening 122 is provided close to the lower surface 101X relative to the uneven portion 121, to further suction the paper P adhering to the lower surface 101X.

Further, in the air guide member 120, an air guide 123 guides the air to be blown to the leading edge portion 2G.

In the present exemplary embodiment, an air supply source such as a fan is provided below the lower surface 101X which is the adsorption portion, as described later. In the present exemplary embodiment, air is first supplied upward above the lower surface 101X, from below the lower surface 101X.

Then, in the present exemplary embodiment, the upwardly supplied air is guided by the air guide 123, and goes downward.

In the present exemplary embodiment, one air guide member 120 is provided with the uneven portion 121 and the air guide 123. Additionally, in the present exemplary embodiment, the air guide 123 is provided in the air guide member 120 provided with the uneven portion 121.

Additionally, in the present exemplary embodiment, the uneven portion 121 and the air guide 123 are provided in the air guide member 120 which is one common member.

In the air guide 123, a recess 124 is convex upward.

More specifically, the recess 124 is formed in the lower surface 123A of the air guide 123, to be convex upward. In the present exemplary embodiment, the inner surface of the recess 124 serves as a guide surface 129 that guides the air to be blown to the paper bundle 54.

The recess 124 is formed in a groove shape. Further, as illustrated in FIG. 4, the recess 124 is provided along the direction in which the leading edge portion 2G of the paper P extends.

More specifically, in the present exemplary embodiment, a rectangular opening 125 is formed in the lower surface 123A (see FIG. 3) of the air guide 123 as illustrated in FIG. 4, and the recess 124 is formed above the opening 125 (in the vertical direction) to be convex upward as illustrated in FIG. 3.

In the present exemplary embodiment, as illustrated in FIG. 4, an opening edge 126 exists around the opening 125 to surround the opening 125. The opening edge 126 is formed in a rectangular shape.

As illustrated in FIG. 4, the opening edge 126 includes a paper-side opening edge 126A, an opposite-side opening edge 126B, and two connection opening edges 126C.

The paper-side opening edge 126A is disposed along the leading edge portion 2G of the paper P.

The opposite-side opening edge 126B is disposed on the opposite side to the leading edge portion 2G of the paper P such that the paper-side opening edge 126A is interposed between the opposite-side opening edge 126B and the leading edge portion 2G. The opposite-side opening edge 126B is also disposed along the leading edge portion 2G of the paper P.

One of the two connection opening edges 126C connects one end of the paper-side opening edge 126A and one end of the opposite-side opening edge 126B to each other.

The other connection opening edge 126C connects the other end of the paper-side opening edge 126A and the other end of the opposite-side opening edge 126B to each other.

Figure 5:
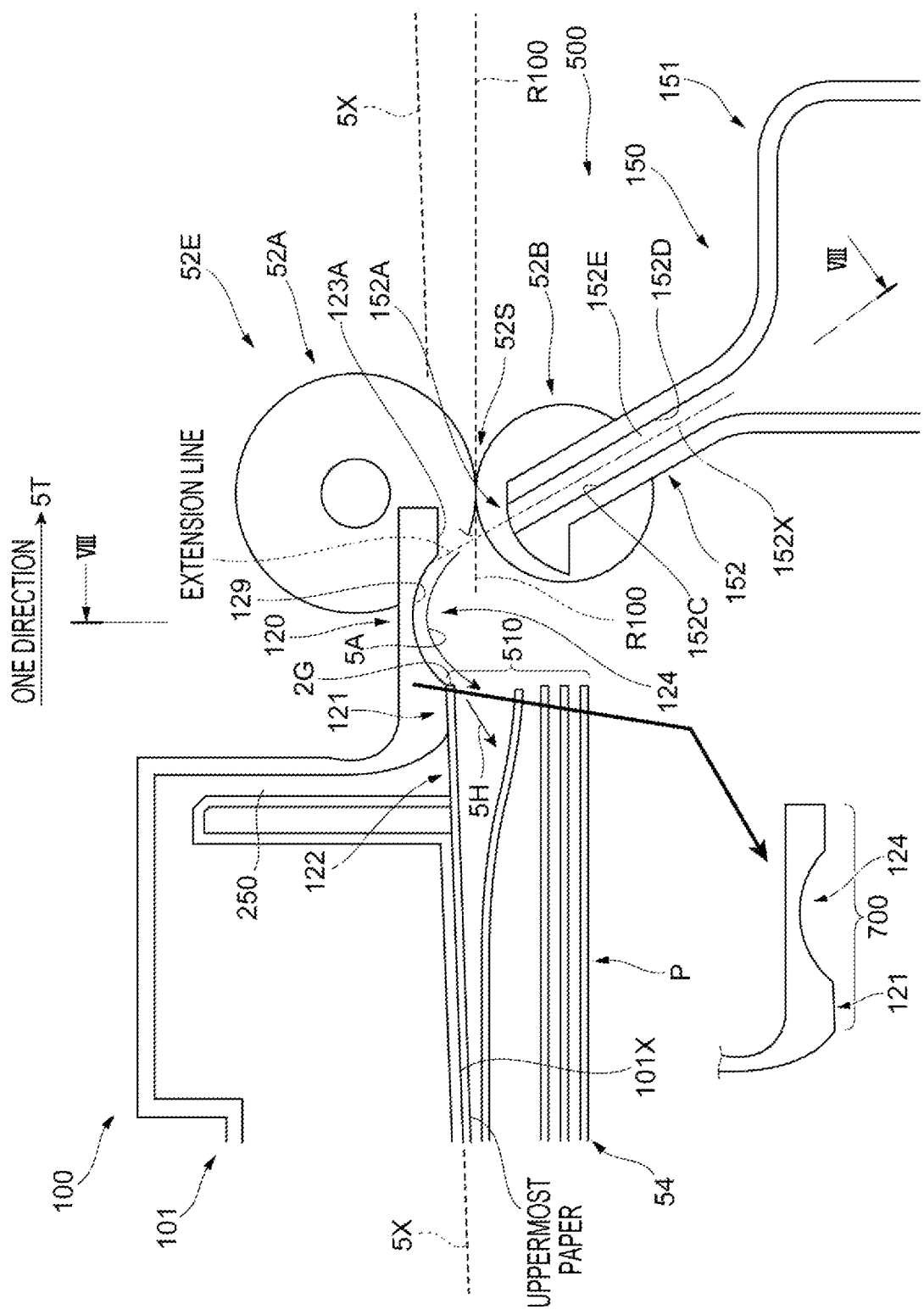
FIG. 5 is a view of the suction unit when viewed from a side of the suction unit.

FIG. 5 is a view of the suction unit 100 when viewed from the side of the suction unit 100.

In the present exemplary embodiment, as illustrated in FIG. 5, a leading-end-side blowing mechanism 500 is provided as another example of the blower.

The leading-end-side blowing mechanism 500 blows air which is an example of gas, to the lateral side of the paper bundle 54 disposed at the leading end thereof in the transport direction of the paper P (hereinafter, referred to as the "leading end lateral side 510"), among the lateral sides of the paper bundle 54.

In other words, the leading-end-side blowing mechanism 500 blows air to the leading end lateral side 510 disposed downstream in the direction in which the paper P is fed out by the paper feed-out unit 1C (see FIG. 1), among the lateral sides of the paper bundle 54.

In the leading-end-side blowing mechanism 500, an air supply 150 supplies air to be blown to the leading end lateral side 510.

In the air supply 150, an air supply source 151 such as a fan is provided, and a pipe 152 guides the air sent out by the air supply source 151 diagonally upward.

The air supply source 151 and the pipe 152 are disposed below the lower surface 101X of the apparatus body 101.

At the tip of the pipe 152, a discharge port 152A discharges air directed toward the recess 124 provided in the air guide member 120.

Further, in the pipe 152, a first inner wall surface 152C and a second inner wall surface 152D face each other.

Further, a third inner wall surface 152E and a fourth inner wall surface (not illustrated) connect the first inner wall surface 152C and the second inner wall surface 152D to each other. In the present exemplary embodiment, the first inner wall surface 152C is disposed close to the papers P relative to the second inner wall surface 152D.

In the present exemplary embodiment, as indicated by the arrow 5A, the air from below the lower surface 101X of the apparatus body 101 goes upward above the lower surface 101X, and then, goes downward so as to be blown from above the lower surface 101X toward the leading end lateral side 510.

Additionally, in the present exemplary embodiment, the air from below an extension surface 5X of the lower surface 101X goes upward above the extension surface 5X, and then, goes downward below the extension surface 5X so as to be blown toward the leading end lateral side 510.

In other words, the air goes downward below the extension surface 5X to be blown to the leading edge portion 2G (see FIG. 4).

In the present exemplary embodiment, air is guided by the pipe 152 to first go upward, and then, goes downward. Then, in the present exemplary embodiment, the air that goes downward is blown to the leading end lateral side 510 of the paper bundle 54.

Additionally, in the present exemplary embodiment, by using the lower surface 123A of the air guide member 120, the air discharged from below the lower surface 101X of the apparatus body 101 goes downward. Then, the air that goes downward is blown to an upper portion of the leading end lateral side 510.

Further, in the present exemplary embodiment, the discharge port 152A is provided below a contact portion 52S between the driving roller 52A and the driven roller 52B that are provided in the most-upstream transport roller 52E.

Additionally, in the present exemplary embodiment, while the air that has passed through the pipe 152 is discharged from the discharge port 152A disposed at the tip of the pipe 152, the discharge port 152A is disposed below the contact portion 52S between the driving roller 52A and the driven roller 52B.

Further, in the present exemplary embodiment, the pipe 152 that guides the air directed upward does not cross a transport path R100 of the paper P. Additionally, in the present exemplary embodiment, the discharge port 152A of the pipe 152 is disposed below the transport path R100 of the paper P.

As a result, in the present exemplary embodiment, only the air crosses the transport path R100 of the paper P. Additionally, in the present exemplary embodiment, the pipe 152 does not cross the transport path R100 of the paper P, and only the air to be blown to the leading edge portion 2G crosses the transport path R100 of the paper P.

Then, in the present exemplary embodiment, the air that has crossed the transport path R100 goes toward the recess 124. Then, the air is guided by the guide surface 129 provided in the recess 124, and the guided air is blown to the leading end lateral side 510.

Here, in the present exemplary embodiment, when the air is blown to the leading end lateral side 510 from above, the air is sent diagonally downward, and the air sent diagonally downward is blown to the leading end lateral side 510 as indicated by the arrow 5H. More specifically, the air sent diagonally downward is blown to an upper portion of the leading end lateral side 510.

More specifically, in the present exemplary embodiment, the air is sent diagonally downward from above the leading end lateral side 510 and from a side away from the leading end lateral side 510, and is blown to the leading end lateral side 510.

More specifically, in the present exemplary embodiment, the air is sent diagonally downward to the leading end lateral side 510 and blown to an upper portion of the leading end lateral side 510, from above the lower surface 101X and from the opposite side to the side where the lower surface 101X is provided with respect to the leading edge portion 2G of the uppermost paper P interposed between both the sides.

In this way, when the air is sent diagonally downward, the air may easily enter between the papers P as indicated by the arrow 5H, as compared with a case where the air is sent directly downward. In this case, the second and subsequent lower papers P (hereinafter, each referred to as the "lower paper P") that adhere to the uppermost paper P adsorbed to the lower surface 101X may be easily separated from the uppermost paper P.

In the present exemplary embodiment, when the paper P loaded on the paper loading unit 53 is transported, first, one paper P is taken out in the manner that the uppermost paper P of the loaded papers P is suctioned to the suction unit 100, as illustrated in FIGS. 2A and 2B.

Additionally, one paper P is taken out in the manner that the paper P positioned at the top of the paper bundle 54 is suctioned to the suction unit 100.

Then, in the present exemplary embodiment, as illustrated in FIG. 2C, the suction unit 100 in a state of suctioning the paper P moves toward the most-upstream transport roller 52E, and the paper P suctioned to the suction unit 100 is fed out to the most-upstream transport roller 52E.

Further, in the present exemplary embodiment, when the paper P is taken out (when the paper P is suctioned by the suction unit 100), the suction unit 100 does not move up and down.

However, without being limited thereto, the suction unit 100 may move down when the paper P is taken out, and the suction unit 100 may move up when the paper P adheres to the suction unit 100.

Here, for example, in a case where the adhesive force among the papers P is large, the lower paper P may adhere to the uppermost paper P suctioned to the suction unit 100. In this case, plural papers P may be supplied to the most-upstream transport roller 52E, and so-called multi-feed may occur.

In the present exemplary embodiment, in order to prevent the occurrence of multi-feed, air is blown to the leading end lateral side 510 from above, as described above. As a result, the lower paper P that adheres to the uppermost paper P is easily separated from the uppermost paper P.

Here, in the present exemplary embodiment, the blowing of air to the leading end lateral side 510 by the leading-end-side blowing mechanism 500 is performed even when the suction unit 100 moves toward the most-upstream transport roller 52E.

Additionally, in the present exemplary embodiment, the blowing of air by the leading-end-side blowing mechanism 500 is performed at all times, so that the blowing of air by the leading-end-side blowing mechanism 500 is performed even when the suction unit 100 moves.

Further, without being limited thereto, the blowing of air may be stopped, or the blowing amount of air may be reduced, when the suction unit 100 moves toward the most-upstream transport roller 52E.

Further, in the present exemplary embodiment, as illustrated in FIG. 5, a paper facing surface 700 is provided downstream in one direction relative to the lower surface 101X which is an example of the adsorption portion, to face the papers P.

More specifically, in the present exemplary embodiment, the paper P adsorbed to the lower surface 101X is transported in one direction indicated by the arrow 5T in FIG. 5, and the paper facing surface 700 is provided downstream in the one direction relative to the lower surface 101X, while facing downward.

In the present exemplary embodiment, the paper P comes into contact with a portion of the paper facing surface 700 that faces downward. More specifically, in the present exemplary embodiment, the uneven portion 121 and the recess 124 are provided in the paper facing surface 700, and the paper P comes into contact with the portion of the paper facing surface 700 where the uneven portion 121 is provided (the portion where the uneven surface is provided).

Further, in the present exemplary embodiment, a portion of the paper facing surface 700 that faces downward faces the paper P adsorbed to the lower surface 101X. More specifically, the portion of the paper facing surface 700 where the uneven portion 121 is provided (the portion where the uneven surface is provided) faces the paper P.

Further, in the present exemplary embodiment, the air supply 150 is provided below the lower surface 101X, and air is blown diagonally upward by the air supply 150.

Further, in the present exemplary embodiment, the paper facing surface 700 intersects the extension line of the direction in which the air is blown by the air supply 150.

Here, the configuration where the paper facing surface 700 intersects the extension line of the direction in which the air is blown by the air supply 150 refers to a state where the paper facing surface 700 intersects the extension line of a central axis 152X of the pipe 152 that extends along the axial direction of the pipe 152.

Figure 7:
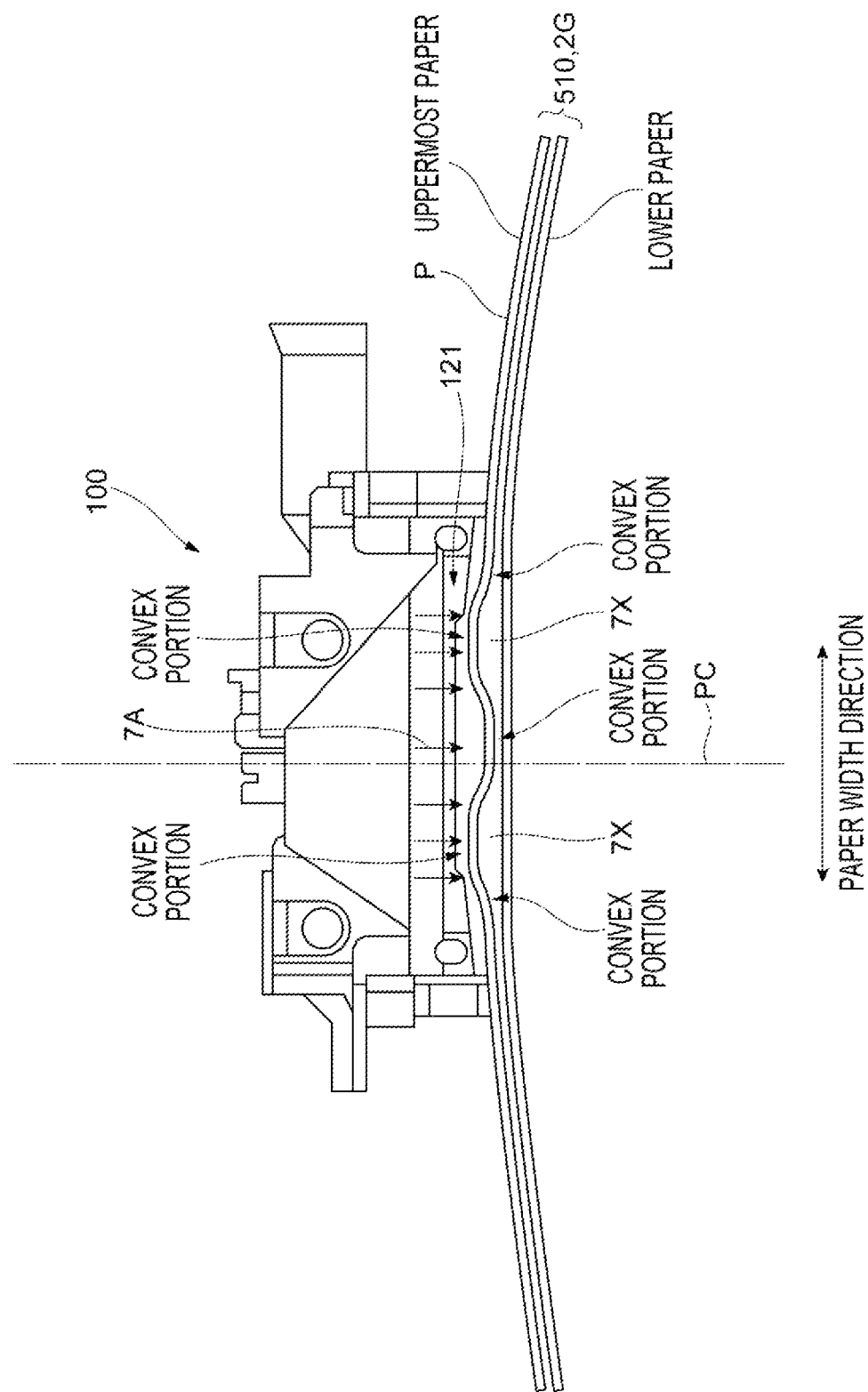
FIG. 7 is a view of the suction unit when viewed from a direction of arrow VII in FIG. 2B.

Further, in the present exemplary embodiment, as illustrated in FIG. 7 (a view of the suction unit 100 when viewed from the direction of arrow VII in FIG. 2B), the unevenness is bilaterally symmetric when the uneven portion (uneven surface) 121 is viewed from the downstream side in the feed-out direction of the paper P.

Additionally, in the present exemplary embodiment, assuming a target axis PC that passes through the center of the paper P in the width direction thereof and extends along the vertical direction, the uneven portion (uneven surface) 121 is axially symmetric with respect the target axis PC.

The air guide member 120 will be further described with reference to FIG. 5.

As illustrated in FIG. 5, in the air guide member 120, the suction opening 122 is provided close to the lower surface 101X relative to the uneven portion 121, to further suction the paper P after the paper P adheres to the lower surface 101X.

In the present exemplary embodiment, when the paper P is brought into a state of being adsorbed to the lower surface 101X, the suction of the paper P by the suction opening 122 starts.

In the present exemplary embodiment, as illustrated in FIG. 5, a connection path 250 connects the suction opening 122 and the inside of the apparatus body 101 to each other, and the inside of the connection path 250 is decompressed. Further, as illustrated in FIG. 3, the connection path 250 is formed such that the width thereof (in the extension direction of the leading edge portion 2G) gradually increases downward.

In the present exemplary embodiment, during a time period until the paper P adheres to the lower surface 101X, a gap is formed between the paper P and the suction opening 122, and the suction of the paper P by the suction opening 122 is not performed.

Then, when the paper P is adsorbed to the lower surface 101X, the gap between the paper P and the suction opening 122 disappears, and the paper P is suctioned by the suction opening 122.

Then, when the paper P is suctioned by the suction opening 122, the leading edge portion 2G of the paper P is pressed and pushed against the uneven portion 121. As a result, the uneven shape is imparted to the leading edge portion 2G. In other words, the shape of waveform (to be described later) is imparted to the leading edge portion 2G.

Figure 6:
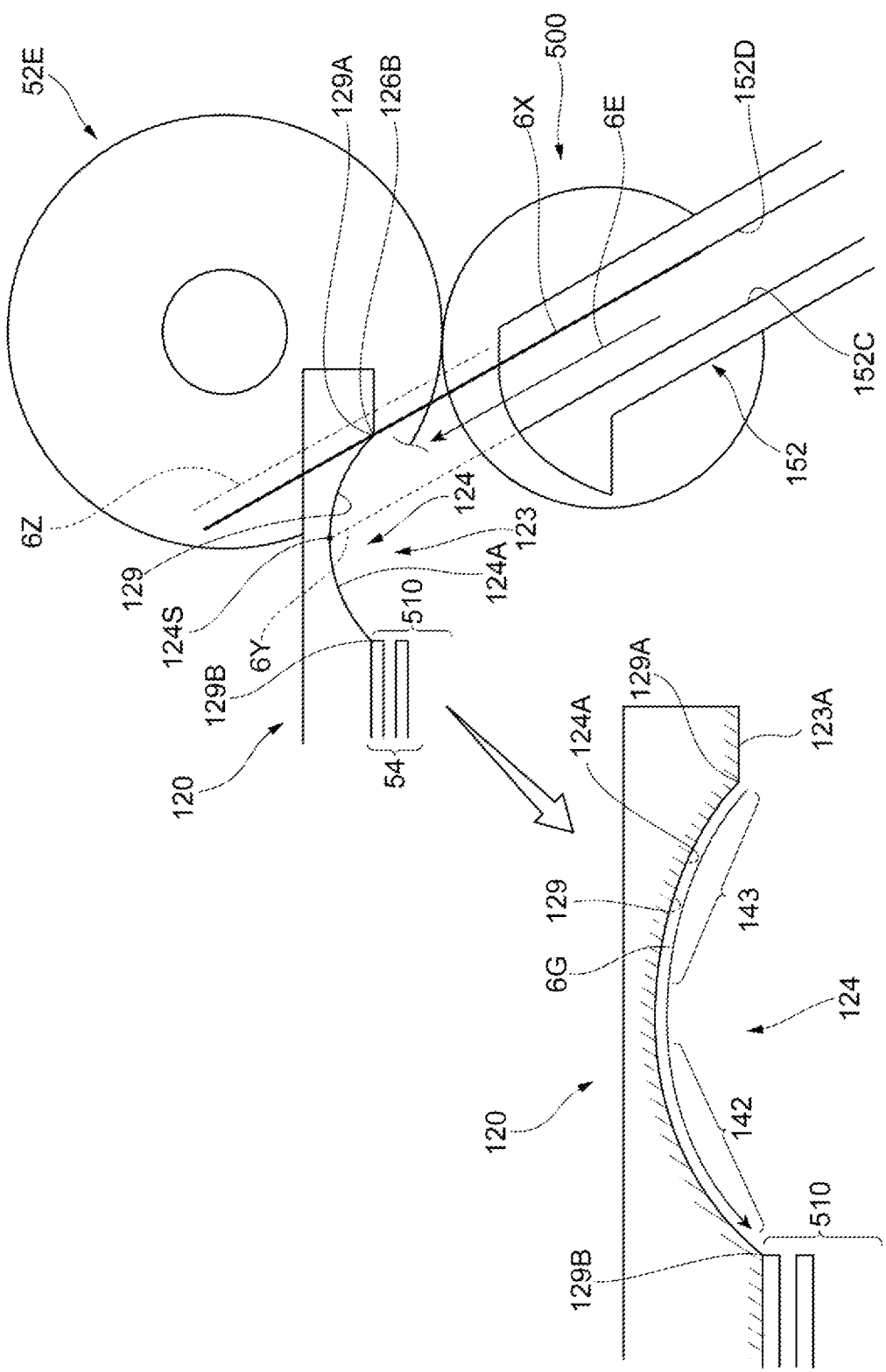
FIG. 6 is a view illustrating a recess.

FIG. 6 is a view illustrating the recess 124.

In the present exemplary embodiment, as described above, the recess 124 is formed in the air guide 123 to be convex upward. As described above, the recess 124 is formed in a groove shape, and disposed along the extension direction of the leading edge portion 2G of the paper P (see FIG. 4).

In the present exemplary embodiment, an inner surface 124A of the recess 124 functions as the guide surface 129. The guide surface 129 guides air, and the guided air is blown to the leading end lateral side 510.

The guide surface 129 makes up a portion of the leading-end-side blowing mechanism 500.

The leading-end-side blowing mechanism 500 blows air to the guide surface 129 so as to change the blowing direction of the air, and then blows the air to the leading end lateral side 510.

The guide surface 129 is provided in a state of being inclined to the flowing direction of the air that flows in one direction. More specifically, the direction indicated by the reference numeral 6E corresponds to the flowing direction of air, and the guide surface 129 is provided in a state of being inclined to (intersecting) the flowing direction.

The guide surface 129 is convex upward, and given a curvature to have an arc cross-sectional shape.

Further, the guide surface 129 includes one end 129A and the other end 129B. Further, the guide surface 129 is disposed above the paper bundle 54 to face downward.

In the present exemplary embodiment, the guide surface 129 is convex upward, in the cross-sectional view of the plane perpendicular to the extension direction of the leading edge portion 2G (see FIG. 4), and given a curvature to have an arc cross-sectional shape.

Further, in the cross-sectional view, the other end 129B of the guide surface 129 is disposed close to the leading end lateral side 510, and the one end 129A thereof is disposed away from the leading end lateral side 510 relative to the other end 129B.

Further, in the present exemplary embodiment, the cross-sectional shape of the guide surface 129 is the same as the shape of a line segment that makes up an ellipse as illustrated in FIG. 6. However, without being limited thereto, the cross-sectional shape of the guide surface 129 may be the same as the shape of a line segment that makes up a perfect circle or may be a V shape as described later.

In the guide surface 129, an inclined surface 142 descends from the side away from the leading end lateral side 510 toward the side close to the leading end lateral side 510.

In the present exemplary embodiment, the inclined surface 142 guides the air to go downward, and the air that goes downward is blown to the leading end lateral side 510.

Further, in the present exemplary embodiment, as illustrated in FIG. 6, a guide portion 143 is provided in the guide surface 129.

The guide portion 143 is disposed at an opposite side to the side where the leading end lateral side 510 is disposed, with the inclined surface 142 interposed between both the sides. Additionally, the guide portion 143 is disposed on the side away from the leading end lateral side 510 relative to the inclined surface 142.

The guide portion 143 guides the air directed upward above the lower surface 101X of the apparatus body 101, to the inclined surface 142. Additionally, the guide portion 143 guides the air sent from below, to the inclined surface 142.

The guide portion 143 ascends while being inclined to approach the inclined surface 142, and guides the air sent from below to the inclined surface 142 by using the inclination of the guide portion 143 itself.

In the present exemplary embodiment, assuming a virtual surface that passes through the second inner wall surface 152D of the pipe 152 (hereinafter, referred to as a "first virtual surface 6X"), the first virtual surface 6X passes through the opposite-side opening edge 126B.

Further, without being limited thereto, the second inner wall surface 152D may be provided such that the first virtual surface 6X passes through between the opposite-side opening edge 126B and the bottom 124S of the guide surface 129 (the bottommost portion of the guide surface 129 formed in a concave shape).

When the first virtual surface 6X is configured to pass through the opposite-side opening edge 126B or between the opposite-side opening edge 126B and the bottom 124S, the amount of air directed toward a portion other than the recess 124 may be reduced, as compared with a case where the first virtual surface 6X passes through, for example, the portion indicated by the reference numeral 6Z.

Further, in the present exemplary embodiment, assuming a virtual surface that passes through the first inner wall surface 152C of the pipe 152 (hereinafter, referred to as a "second virtual surface 6Y"), the second virtual surface 6Y passes through the bottom 124S of the guide surface 129.

Further, without being limited thereto, the first inner wall surface 152C may be provided such that the second virtual surface 6Y passes through a portion close to the bottom 124S relative to the first virtual surface 6X, between the bottom 124S and the opposite-side opening edge 126B.

In the present exemplary embodiment, when air is blown to the leading end lateral side 510, the air flows along the guide surface 129, and flows from the one end 129A toward the other end 129B as indicated by the reference numeral 6G in FIG. 6.

Then, the air goes away from the guide surface 129 toward the leading end lateral side 510, and is blown to the leading end lateral side 510.

In the present exemplary embodiment, as indicated by the arrow 7A in FIG. 7, the air is blown from above the leading end lateral side 510 toward the leading end lateral side 510, and this air is blown to the portion to which the shape of waveform is imparted, in the leading end lateral side 510.

More specifically, in the present exemplary embodiment, the leading edge portion 2G of the paper P is pushed against the uneven portion 121, and as a result, the shape of waveform is imparted to the leading edge portion 2G of the paper P.

In the present exemplary embodiment, the air is blown to the portion to which the shape of waveform is imparted, from above.

As a result, the air easily enters between the uppermost paper P suctioned to the suction unit 100 and the lower paper P.

More specifically, the air easily enters between the uppermost paper P and the lower paper P through gaps 7X formed between the uppermost paper P and the lower paper P.

In this case, the lower paper P may be easily separated from the uppermost paper P.

Here, the "shape of waveform" refers to a shape in which a first convex portion that projects from one side of the paper P toward the other side thereof in the thickness direction of the paper P, and a second convex portion that projects from the other side of the paper P toward the one side thereof in the thickness direction of the paper P are alternately arranged in the extension direction of the leading edge portion 2G.

Here, the number of the first and second convex portions is not specifically limited, and it may be said that the waveform shape also has been imparted when one first convex portion and one second convex portion are adjacent to each other.

Figure 8:
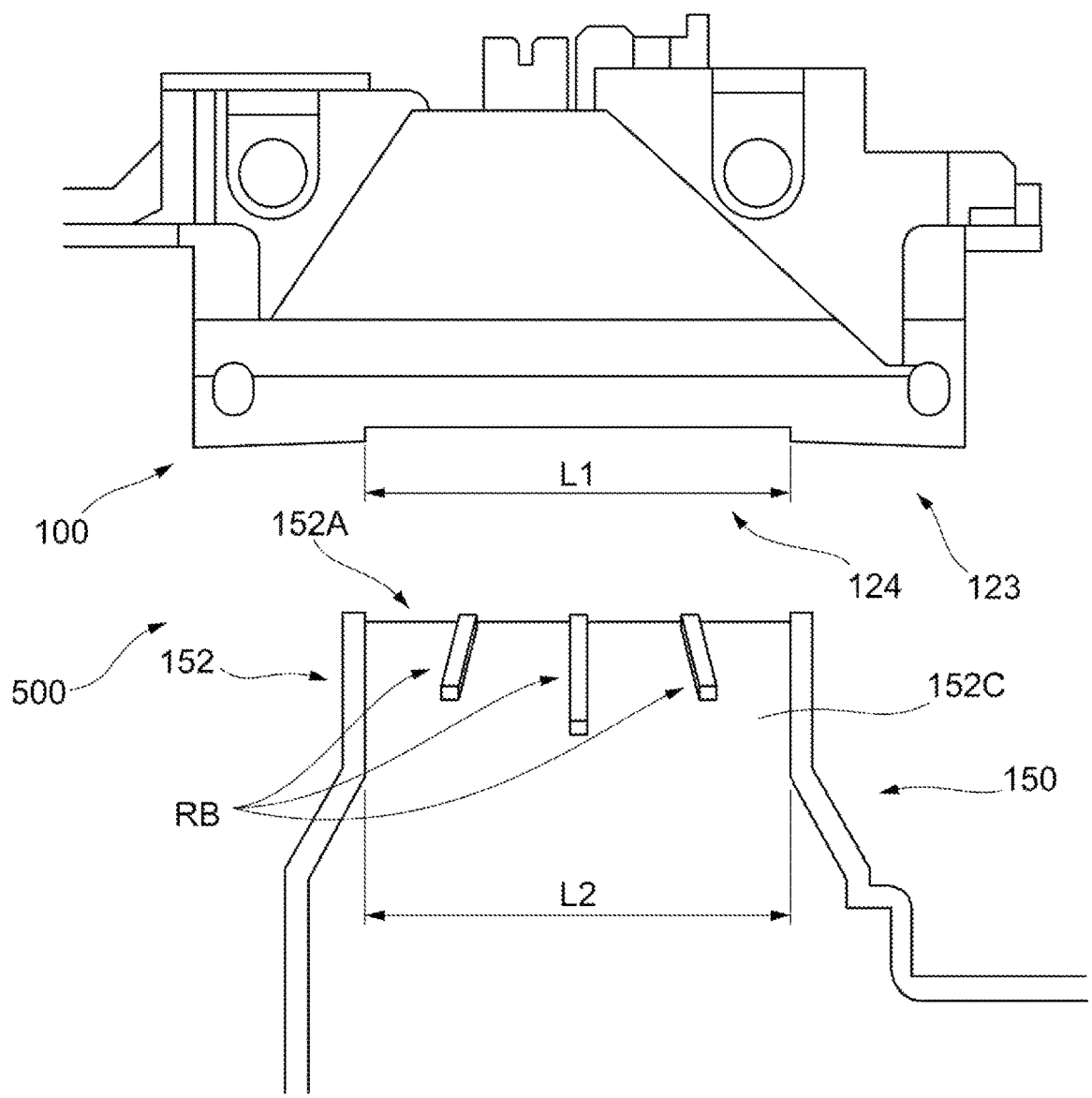
FIG. 8 is a cross-sectional view of the suction unit and a leading-end-side blowing mechanism which is taken along line VIII-VIII in FIG. 5.

FIG. 8 is a cross-sectional view of the suction unit 100 and the leading-end-side blowing mechanism 500 which is taken along line VIII-VIII in FIG. 5.

In the present exemplary embodiment, the width L1 of the recess 124 formed in the air guide 123 is equal to the width L2 of the discharge port 152A provided at the tip of the pipe 152.

Additionally, the width L1 of the recess 124 formed in the air guide 123 and the width L2 of the discharge port 152A provided at the tip of the pipe 152 are equal to each other in the extension direction of the leading edge portion 2G (see FIG. 4).

Further, in the present exemplary embodiment, descriptions are made on a case where the width L1 of the recess 124 formed in the air guide 123 and the width L2 of the discharge port 152A provided at the tip of the pipe 152 are equal to each other. However, the width L1 of the recess 124 formed in the air guide 123 may be larger than the width L2 of the discharge port 152A provided at the tip of the pipe 152.

Here, when the width L1 of the recess 124 formed in the air guide 123 is equal to or larger than the width L2 of the discharge port 152A provided at the tip of the pipe 152, a relatively larger amount of air goes toward the leading edge portion 2G, and a relatively larger amount of air is blown to the leading edge portion 2G, as compared with a case where the width L1 of the recess 124 formed in the air guide 123 is narrower than the width L2 of the discharge port 152A provided at the tip of the pipe 152.

In the present exemplary embodiment, three ribs RB are provided on the first inner wall surface 152C, along the flowing direction of air.

Among the three ribs RB, the ribs RB disposed at both ends approach the center of the recess 124 in the width direction of the recess 124, toward the downstream side in the flowing direction of air.

As a result, in the present exemplary embodiment, a relatively larger amount of air goes toward the recess 124, as compared with a case where the ribs RB are not provided.

Figure 9A:
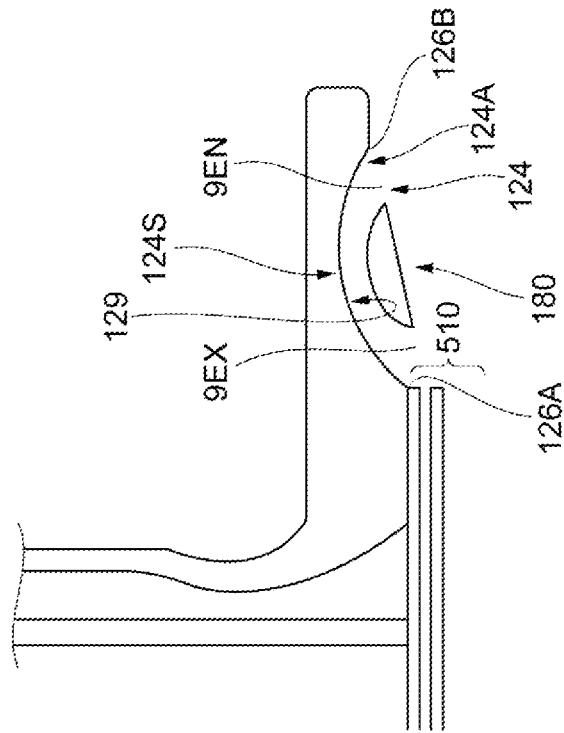
FIGS. 9A and 9B are views illustrating other examples of the configuration of the recess.
Figure 9B:
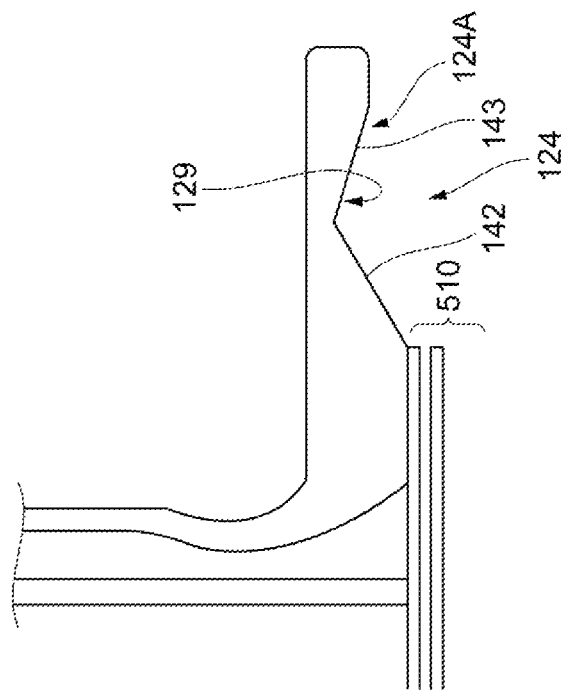

FIGS. 9A and 9B are views illustrating other examples of the configuration of the recess 124.

Descriptions have been made on a case where the guide surface 129 is given a curvature. However, without being limited thereto, the guide surface 129 may be formed in a V shape as illustrated in FIG. 9A.

In the configuration example illustrated in FIG. 9A, the inclined surface 142 is provided in the guide surface 129 to descend toward the leading end lateral side 510, as in the configuration described above. Here, the inclined surface 142 is not given a curvature, and is planar.

Further, in this configuration example as well, the guide portion 143 is provided at the opposite side to the side where the leading end lateral side 510 is disposed with respect to the inclined surface 142 interposed between both the sides, to guide the air toward the inclined surface 142.

The guide portion 143 is formed to ascend toward the leading end lateral side 510. Further, the guide portion 143 is not given a curvature, and is formed to be planar.

Further, in the configuration example illustrated in FIG. 9B, a facing member 180 is provided at a position that faces the guide surface 129. The facing member 180 is provided along the extension direction of the leading edge portion 2G (see FIG. 4).

The facing member 180 is fixed to the positions indicated by the reference numerals 4Z in FIG. 4. Additionally, the facing member 180 is fixed to the portions of the air guide 123 where both sides of the recess 124 are disposed.

Further, as illustrated in FIG. 9B, the facing member 180 is disposed with a gap from the guide surface 129, and disposed at a position that faces the guide surface 129.

Further, the facing member 180 is disposed between the paper-side opening edge 126A and the opposite-side opening edge 126B.

In this configuration example, the gap between the opposite-side opening edge 126B and the facing member 180 serves as an entrance 9EN for air. Further, the gap between the paper-side opening edge 126A and the facing member 180 serves as an exit 9EX for air.

In this configuration example, the air supplied by the air supply 150 (not illustrated in FIG. 9B) goes toward the guide surface 129 through the entrance 9EN. Then, the air is guided by the guide surface 129 and goes toward the exit 9EX. Then, the air discharged from the exit 9EX is blown to the leading end lateral side 510.

Next, descriptions will be made on a control of an amount of the air blown by the leading-end-side blowing mechanism 500.

In the present exemplary embodiment, the CPU 103A which is an example of a processor (see FIG. 11) reduces the amount of the air blown to the leading end lateral side 510, when a predetermined specific condition is satisfied.

Specifically, when a predetermined specific condition is satisfied, the CPU 103A reduces the output of the air supply source provided in the leading-end-side blowing mechanism 500, so as to reduce the amount of the air blown to the leading end lateral side 510.

More specifically, when the environment of the place where the paper feeding apparatus 1B (see FIG. 1) is installed satisfies a predetermined specific condition, and when the papers P included in the paper bundle 54 satisfy a specific condition, the CPU 103A reduces the amount of the gas blown to the leading end lateral side 510.

More specifically, when the humidity of the place where the paper feeding apparatus 1B (see FIG. 1) is installed is lower than a predetermined threshold humidity, and when a value specified by information on the thickness of the papers P included in the paper bundle 54 is smaller than a predetermined threshold, the CPU 103A reduces the amount of the gas blown to the leading end lateral side 510.

More specifically, for example, when the humidity of the place where the paper feeding apparatus 1B is installed is lower than 50%, and when the basis weight of the papers P is smaller than 176 grams per square meter (gsm), the CPU 103A reduces the amount of the air blown to the leading end lateral side 510.

Further, in the present exemplary embodiment, descriptions are made on a case where the basis weight is acquired as the information on the thickness of the papers P included in the paper bundle 54.

However, without being limited thereto, a specific numerical value that indicates the thickness of the papers P itself may be acquired as the information on the thickness of the papers P included in the paper bundle 54. Further, information such as a model or product number of the papers P may be obtained, and the thickness of the papers P may be grasped based on the model or product number.

In the present exemplary embodiment, the environment sensor S (see FIG. 1) acquires the humidity of the place where the paper feeding apparatus 1B is installed. By obtaining the output from the environment sensor S, the CPU 103A obtains information on the humidity of the place where the paper feeding apparatus 1B is installed.

Further, in the present exemplary embodiment, the information on the papers P included in the paper bundle 54 is input to the image forming apparatus 1 in the manner that a user operates the UI 70. The CPU 103A obtains the information on the papers P that is input through the UI 70, so as to acquire the information on the papers P.

The CPU 103A determines whether the predetermined condition is satisfied, based on the information from the environment sensor S and the UI 70.

Then, when the predetermined condition is satisfied, the CPU 103A reduces the amount of the gas blown to the leading end lateral side 510.

Specifically, as described above, for example, when the humidity of the place where the paper feeding apparatus 1B is installed is lower than 50%, and when the basis weight of the papers P is smaller than 176 gsm, the CPU 103A reduces the amount of the air blown to the leading end lateral side 510.

By reducing the amount of the air blown to the leading end lateral side 510 when the predetermined condition is satisfied, the multi-feed hardly occurs.

Specifically, when the amount of the air blown to the leading end lateral side 510 is reduced, the lower paper P hardly adheres to the uppermost paper P, so that the uppermost paper P is hardly fed out in a state where the lower paper P adheres to the uppermost paper P.

Here, the following cases are assumed: the thickness of the papers P is small; and the humidity of the place where the paper feeding apparatus 1B is installed is lower than a predetermined threshold humidity.

Figure 12:
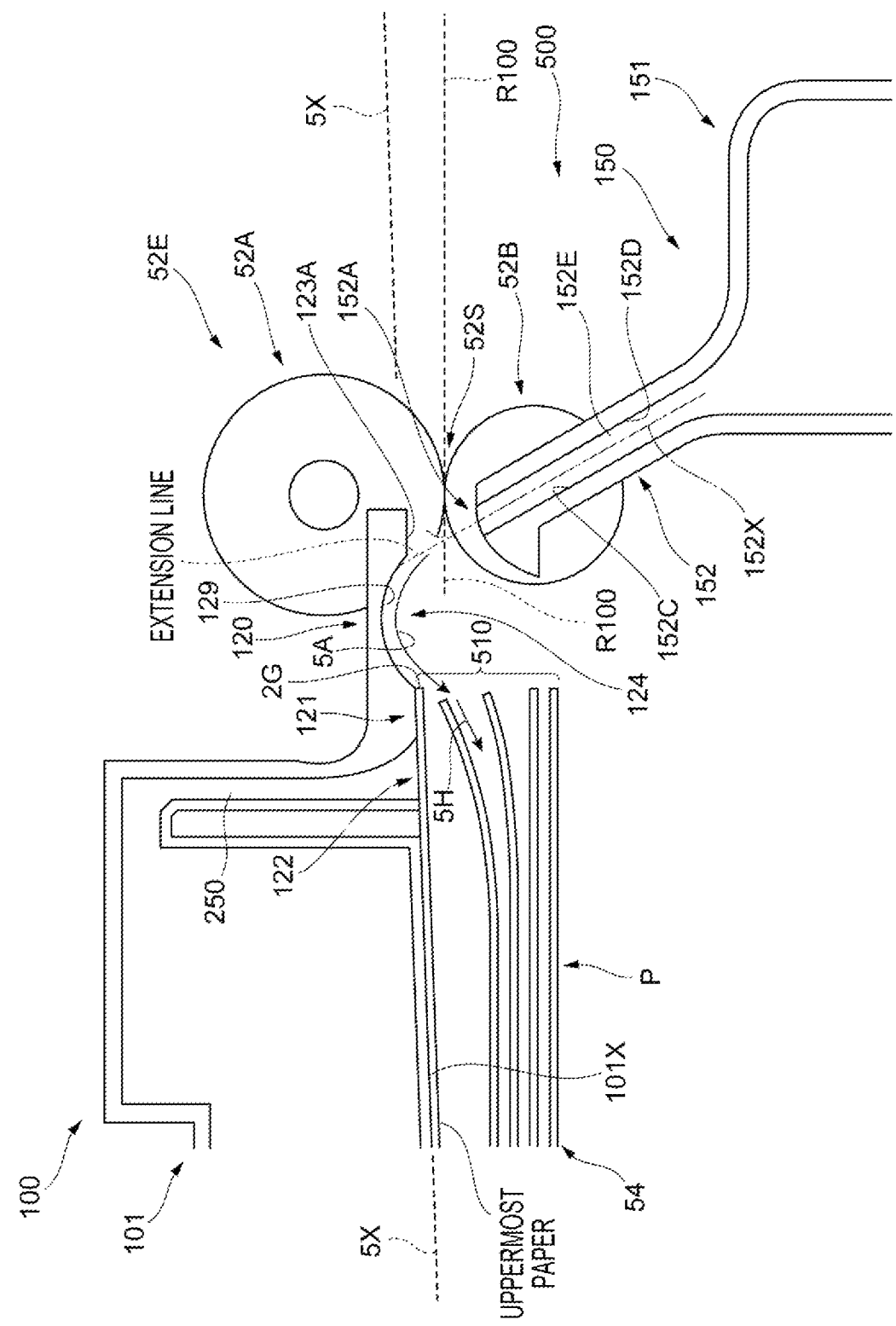
FIG. 12 is a view illustrating a state of papers included in a paper bundle.

In this case, as illustrated in FIG. 12 (a view illustrating the state of the papers P included in the paper bundle 54), the papers P included in the paper bundle 54 may be easily curled.

In this case, when air is blown to the leading end lateral side 510, for example, the air may easily enter between the second top paper P and the third top paper P, as illustrated in FIG. 13A (a view illustrating the state of the paper bundle 54 when air is blown).

In this case, the second top paper P floats upward, and adheres to the uppermost paper P. In this case, not only the uppermost paper P but also the second top paper P are fed out, and the multi-feed easily occurs.

Meanwhile, when the air amount is reduced as in the present exemplary embodiment, the air hardly enters between the second top paper P and the third top paper P as illustrated in FIG. 13B. In this case, the second top paper P hardly adheres to the uppermost paper P, so that the multi-feed hardly occurs.

The amount of the air blown to the leading end lateral side 510 may be made zero (0). Alternatively, the air may be blown to the leading end lateral side 510 while lowering the output, rather than making the air amount zero (0).

The blowing of air by the leading-end-side blowing mechanism 500 performs a role of separating the uppermost paper P and the lower paper P from each other.

When the air amount is made zero (0), the separation may not be implemented. When the air is blown to the leading end lateral side 510 while reducing the output, the function of separating the uppermost paper P and the lower paper P from each other may be maintained.

Descriptions have been made on a case where the air amount is reduced when the following two conditions are satisfied: a first condition that the papers P included in the paper bundle 54 satisfy a specific condition; and a second condition that the environment of the place where the paper feeding apparatus 1B is installed satisfies a predetermined specific condition.

However, without being limited thereto, the air amount may be reduced when either one of the two conditions is satisfied.

In addition, when the two conditions described above are satisfied, the CPU 103A may also reduce the amount of the air blown to the perpendicular lateral side 401 by the lateral side blowing mechanism 400 (see FIG. 4).

Further, when the two conditions described above are satisfied, the CPU 103A may stop the lateral side blowing mechanism 400 to zero the amount of the air blown to the perpendicular lateral side 401.

When the amount of the air blown to the perpendicular lateral side 401 by the lateral side blowing mechanism 400 is reduced or made zero (0), the lower paper P also hardly adheres to the uppermost paper P, so that the multi-feed hardly occurs.

Further, the condition for reducing the amount of the air blown to the perpendicular lateral side 401 by the lateral side blowing mechanism 400 is not limited to a case where the two conditions are satisfied as described above. When any one of the two conditions is satisfied, the reduction of the air amount may be performed.

In addition, when the two conditions described above are satisfied or when any one of the two conditions is satisfied, the CPU 103A may perform the process of reducing the air amount or making the air amount zero (0), for both the lateral side blowing mechanism 400 and the leading-end-side blowing mechanism 500.

In addition, when the two conditions described above are satisfied or when any one of the two conditions is satisfied, the CPU 103A may perform the process of reducing the air amount or making the air amount zero (0), for only one of the lateral side blowing mechanism 400 and the leading-end-side blowing mechanism 500.

From another point of view, in the present exemplary embodiment, when the two conditions described are satisfied or when any one of the two conditions is satisfied, the CPU 103A changes the size of a blowing target area WA to which air is blown, in the paper bundle 54.

Specifically, when the two conditions are satisfied or when any one of the two conditions is satisfied, the CPU 103A changes the blowing target area WA from the state illustrated in FIG. 14A (a view illustrating the blowing target area WA) to the state illustrated in FIG. 14B (a view illustrating the blowing target area WA).

In the present exemplary embodiment, as illustrated in FIG. 14A, the leading-end-side blowing mechanism 500 blows air to the blowing target area WA that extends vertically in the leading end lateral side 510 of the paper bundle 54.

When the two conditions described above are satisfied or when any one of the two conditions is satisfied, the CPU 103A changes the size of the blowing target area WA.

Specifically, when the humidity of the place where the paper feeding apparatus 1B is installed is lower than a predetermined threshold humidity, and/or when a value specified by information on the thickness of the papers P included in the paper bundle 54 is smaller than a predetermined threshold, the CPU 103A reduces the size of the blowing target area WA as illustrated in FIG. 14B.

More specifically, when the humidity of the place where the paper feeding apparatus 1B is installed is lower than 50%, and/or when the basis weight of the papers P is smaller than 176 gsm, the CPU 103A reduces the size of the blowing target area WA as illustrated in FIG. 14B.

More specifically, as illustrated in FIGS. 14A and 14B, the CPU 103A reduces the size of the blowing target area WA, such that the width of the blowing target area WA in the vertical direction becomes small.

More specifically, as illustrated in FIGS. 14A and 14B, the CPU 103A reduces the size of the blowing target area WA, by changing the position of a lower end 98 of the blowing target area WA to move the position of the lower end 98 upward, so as to reduce the width of the blowing target area WA in the vertical direction.

In the present exemplary embodiment, as illustrated in FIGS. 14A and 14B, the blowing target area WA includes the portion where the uppermost paper P is placed.

The leading-end-side blowing mechanism 500 blows air to the blowing target area WA that extends vertically and includes the portion where the uppermost paper P is placed.

When changing the size of the blowing target area WA, the CPU 103A changes the position of the lower end 98 so as to change the size of the blowing target area WA as described above.

Further, in the present exemplary embodiment, the CPU 103A changes the size of the blowing target area WA without changing the position of an upper end 99 of the blowing target area WA, or without moving the upper end 99 downward even when the position of the upper end 99 is changed.

In this way, in the present exemplary embodiment, when a specific condition is satisfied, the CPU 103A moves the position of the lower end 98 of the blowing target area WA upward, so as to reduce the size of the blowing target area WA.

As a result, as described above, the air hardly enters between the second top paper P and the third top paper P below the second top paper P as illustrated in FIG. 14B, so that the multi-feed hardly occurs.

Further, in the present exemplary embodiment, when changing the size of the blowing target area WA, the CPU 103A changes the amount of the air blown to the leading end lateral side 510 by the leading-end-side blowing mechanism 500, so as to change the size of the blowing target area WA.

More specifically, the CPU 103A reduces the amount of the air blown to the leading end lateral side 510 by the leading-end-side blowing mechanism 500 so as to reduce the size of the blowing target area WA, and increases the air amount so as to increase the size of the blowing target area WA.

More specifically, the CPU 103A changes the size of the blowing target area WA by changing the amount of the air that goes toward the guide surface 129 from the air supply 150.

As illustrated in FIG. 14A, the leading-end-side blowing mechanism 500 includes the guide surface 129.

The guide surface 129 guides the air blown to the leading end lateral side 510, and is inclined to (intersects) the flowing direction of the air that flows toward one direction indicated by the arrow 14A.

More specifically, the guide surface 129 is inclined to the flowing direction of the air that flows from the air supply 150 toward the guide surface 129, that is, the flowing direction of the air that flows in one direction indicated by the arrow 14A.

The CPU 103A changes the amount of the air that goes from the air supply 150 toward the guide surface 129, so as to change the size of the blowing target area WA.

Specifically, the CPU 103A increases the size of the blowing target area WA by increasing the amount of the air that goes from the air supply 150 toward the guide surface 129.

When the amount of air that goes toward the guide surface 129 is large, an air flow that has a relatively large width W occurs as illustrated in FIG. 14A. In this case, the air is blown to a relatively wider range of the leading end lateral side 510, so that the blowing target area WA becomes large.

Further, as illustrated in FIG. 14B, the CPU 103A reduces the size of the blowing target area WA by reducing the amount of the air that goes from the air supply 150 toward the guide surface 129.

When the amount of air that goes toward the guide surface 129 is small, the air flows in a laminar flow state along the guide surface 129. In this case, an air flow that has a relatively narrow width W occurs, as compared with a case where the amount of air that goes toward the guide surface 129 is large.

In this case, the air is blown to a relatively narrow range of the leading end lateral side 510, so that the size of the blowing target area WA is reduced.

Further, the lateral side blowing mechanism 400 (see FIG. 4) may perform the process of reducing the blowing target area WA.

When the blowing target area WA of the paper bundle 54 (not illustrated) to which air is blown by the lateral side blowing mechanism 400 is relatively large, the air is blown over a relatively large range that extends vertically. In this case, the air enters among the papers P in the relatively large range that extends vertically. As a result, the multi-feed caused from the adhesion between the papers P hardly occurs.

Meanwhile, when the blowing target area WA is relatively large, the lower paper P adheres to the uppermost paper P so that the multi-feed may easily occur, as described above.

In this case, as described above, by reducing the blowing target area WA (by reducing the width of the blowing target area WA in the vertical direction) when the predetermined specific condition is satisfied, the upward movement of the papers P hardly occurs, so that the adhesion of the lower paper P to the uppermost paper P hardly occurs.

Similarly, the size of the blowing target area WA may be changed by the lateral side blowing mechanism 400, when the two conditions described above are satisfied or when any one of the two conditions is satisfied.

Further, the size of the blowing target area WA may be changed by, for example, providing a shutter (a moving member) configured to narrow the air flow path and moving the shutter.

Further, in this case, when the size of the blowing target area WA is reduced by narrowing the flow path, the flow velocity of the air increases, and the upward movement of the papers P may easily occur due to the increase in flow velocity.

Thus, when the size of the blowing target area WA is reduced by narrowing the flow path, the flow rate of air may be reduced as well.

Figure 15:
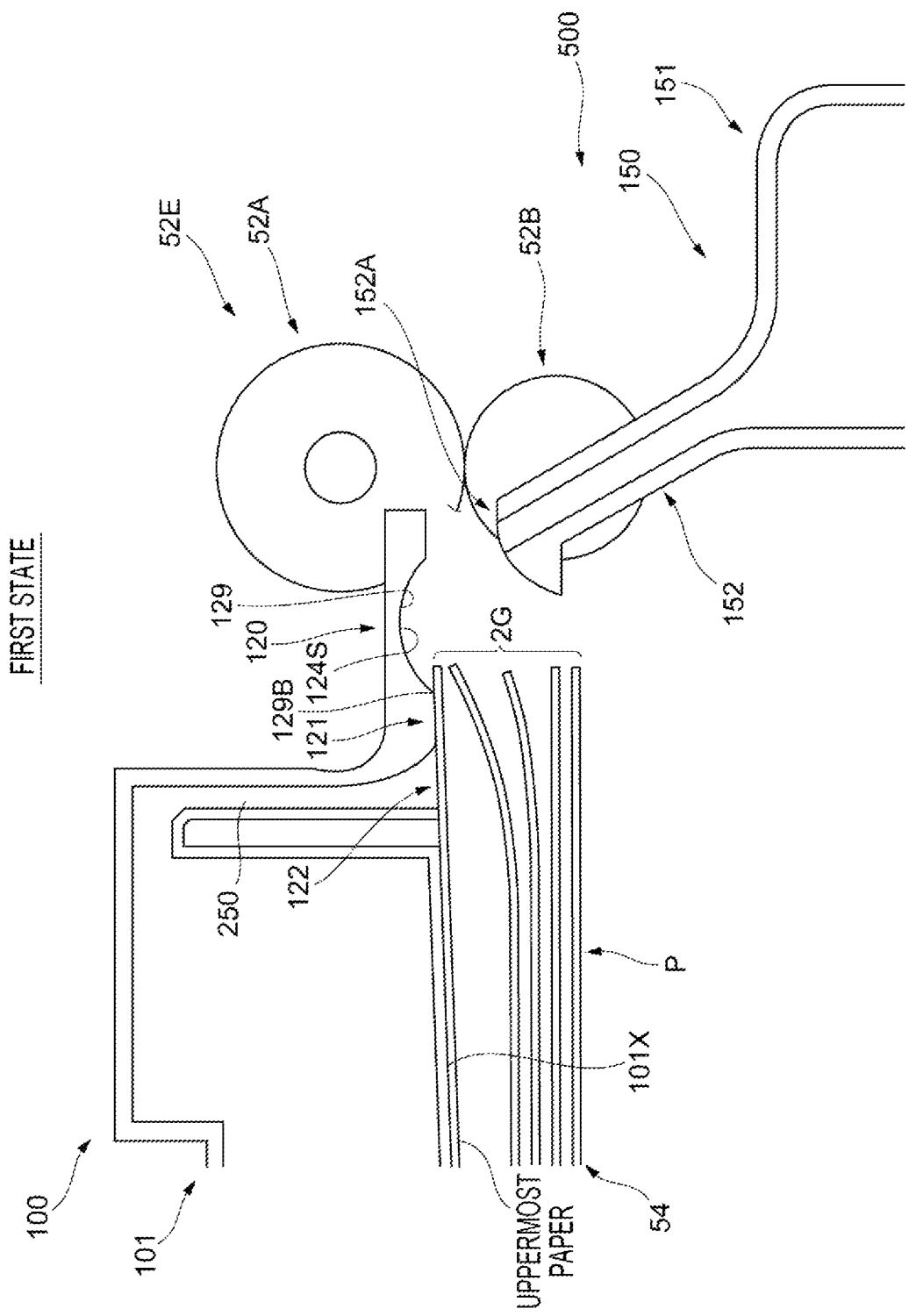
FIG. 15 is a view illustrating another example of a process.
Figure 16:
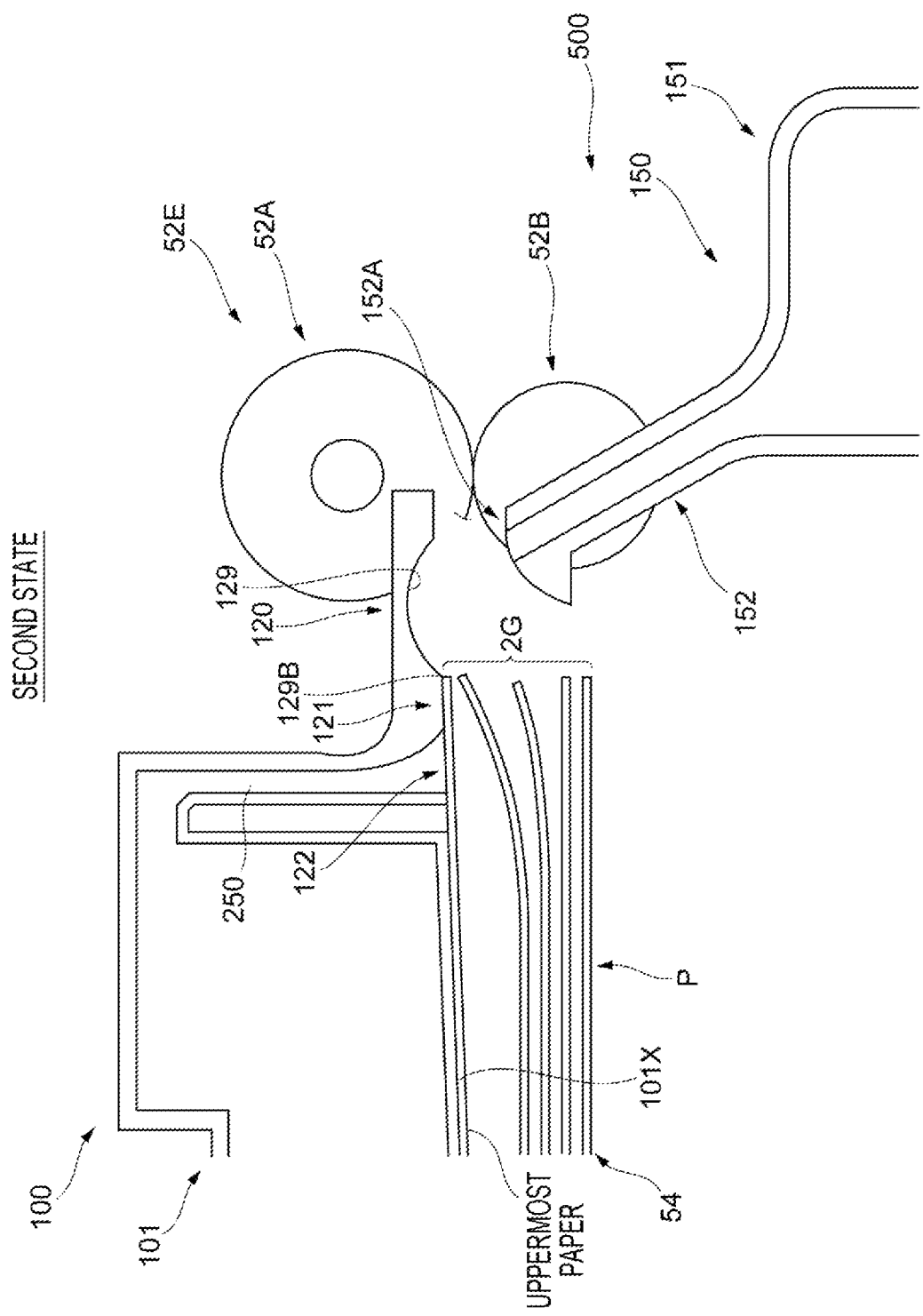
FIG. 16 is a view illustrating another example of a process.

FIGS. 15 and 16 are views illustrating another example of the process.

In the descriptions above, the occurrence of multi-feed is prevented by reducing the amount of air blown to the paper bundle 54 or reducing the blowing target area WA. Further, the occurrence of multi-feed may be prevented, for example, even when the position of the guide surface 129 is changed with respect to the paper bundle 54.

In the paper feeding apparatus 1B of the present exemplary embodiment, the suction unit 100 is movable, and thus, the position of the guide surface 129 may be changed with respect to the paper bundle 54.

In this process example, the occurrence of multi-feed is prevented by changing the position of the guide surface 129 with respect to the paper bundle 54.

Specifically, the paper feeding apparatus 1B of the present exemplary embodiment is configured to be able to enter at least two states which include a first state illustrated in FIG. 15 and a second state illustrated in FIG. 16.

In the first state illustrated in FIG. 15, a portion of the paper bundle 54 (the leading edge portion 2G) is disposed at a position that faces the guide surface 129. In the second state illustrated in FIG. 16, the paper bundle 54 is not disposed at the position that faces the guide surface 129.

The CPU 103A moves the suction unit 100 to be brought into either one of the first state where a portion of the paper bundle 54 is disposed at the position that faces the guide surface 129 and the second state where the paper bundle 54 is not disposed at the position that faces the guide surface 129.

Further, in the present exemplary embodiment, a case where the suction unit 100 is moved is described. Meanwhile, for example, the paper bundle 54 may be moved or both the paper bundle 54 and the suction unit 100 may be moved, to perform the switching between the two states.

In other words, the "changing the position of the guide surface 129 with respect to the paper bundle 54" is not limited to the aspect where the guide surface 129 is moved to change the position of the guide surface 129 with respect to the paper bundle 54, and includes an aspect where the paper bundle 54 is moved to change the position of the guide surface 129 with respect to the paper bundle 54.

In this process example, the CPU 103A changes the position of the guide surface 129 with respect to the paper bundle 54, when the environment of the place where the paper feeding apparatus 1B is installed satisfies a predetermined specific condition.

Specifically, when the humidity of the place where the paper feeding apparatus 1B is installed is higher than a predetermined threshold humidity, the CPU 103A takes the first state where a portion of the paper bundle 54 is disposed at the position that faces the guide surface 129, as illustrated in FIG. 15.

Further, when the humidity of the place where the paper feeding apparatus 1B is installed is lower than a predetermined threshold humidity, the CPU 103A takes the second state where a portion of the paper bundle 54 is not disposed at the position that faces the guide surface 129, as illustrated in FIG. 16.

More specifically, when the humidity of the place where the paper feeding apparatus 1B is installed is lower than a predetermined threshold humidity, as illustrated in FIG. 16, the CPU 103A causes the leading edge portion 2G of the paper bundle 54 to be disposed at the position that faces the other end 129B of the guide surface 129, or causes the leading edge portion 2G to be disposed close to the uneven portion 121 relative to the other end 129B.

The inventors of the present disclosure have studied the presence/absence of multi-feed, by sequentially changing the position of the guide surface 129 with respect to the paper bundle 54.

As a result, the inventors have found that the multi-feed hardly occurs by taking the first state when the humidity is higher than a predetermined threshold humidity (for example, 50%), and taking the second state when the humidity is lower than a predetermined threshold humidity.

Here, in the environment where the humidity is higher than a predetermined threshold humidity, when the second state where a portion of the paper bundle 54 is not disposed at the position that faces the guide surface 129 is taken, the multi-feed occurs more frequently, as compared with a case where the first state is taken.

Further, in the environment where the humidity is lower than a predetermined threshold humidity, when the first state where a portion of the paper bundle 54 is disposed at the position that faces the guide surface 129 is taken, the multi-feed occurs more frequently, as compared with a case where the second state is taken.

Further, the "first state where a portion of the paper bundle 54 is disposed at the position that faces the guide surface 129" may be as follows. That is, the leading edge portion 2G of the paper bundle 54 may be disposed close to the other end 129B relative to the bottom 124S (the bottommost portion of the guide surface 129 formed in a concave shape) (see FIG. 15) and this leading edge portion 2G may be disposed close to the bottom 124S relative to the other end 129B.

In other words, the leading edge portion 2G may be disposed close to the other end 129B relative to the bottom 124S and close to the bottom 124S relative to the other end 129B, in the horizontal direction.

Miscellaneous

Descriptions have been made on the process of reducing the air amount or narrowing the blowing target area WA when a predetermined specific condition is satisfied, as an example of the process of preventing the multi-feed.

However, even though a predetermined specific condition has been satisfied, the air amount may be increased or the blowing target area WA may be extended in the middle, when a predetermined second condition is satisfied.

Specifically, in the present exemplary embodiment, when the humidity of the place where the paper feeding apparatus 1B is installed is lower than a predetermined threshold humidity, the air amount is reduced, or the blowing target area WA is narrowed, as described above.

In this case, when a predetermined second condition is satisfied, for example, when the paper bundle 54 is just opened, the air amount may be increased, or the blowing target area WA may be extended, in the middle.

More specifically, for example, when a predetermined number of papers P are transported from the paper bundle 54, the air amount may be increased, or the blowing target area WA may be extended.

Here, the present disclosure is not limited to a case where the curling occurs in all of the papers P included in the paper bundle 54. For the paper bundle 54 that is just opened as described above, the curling is likely to occur in the relatively upper papers P that are easily exposed to the outside air, but this curling hardly occurs the papers other than the relatively upper papers P.

In this case, at the initial stage, the air amount may be set to be small, or the blowing target area WA may be set to be narrow. However, after a predetermined number of papers are transported, the process may be changed to increase the air amount or extend the blowing target area WA.

Further, the guide surface 129 that is curved with a curvature given thereto has been described as an example.

However, the guide surface 129 may not be necessarily given a curvature. As illustrated in FIG. 17 (a view illustrating another example of the configuration of the guide surface 129), the guide surface 129 may not be given a curvature, and may be formed in a flat shape.

Even when the guide surface 129 is formed in a flat shape, air is guided by the guide surface 129, and blown to the leading end lateral side 510 of the paper bundle 54.

Further, in the descriptions above, the suction unit 100 is moved so as to move the paper P toward the most-upstream transport roller 52E. However, the present disclosure is not limited thereto, and the paper P may be moved toward the most-upstream transport roller 52E without moving the suction unit 100 as illustrated in FIG. 10 (a view illustrating another example of the configuration of the paper feed-out unit 1C).

Figure 10:
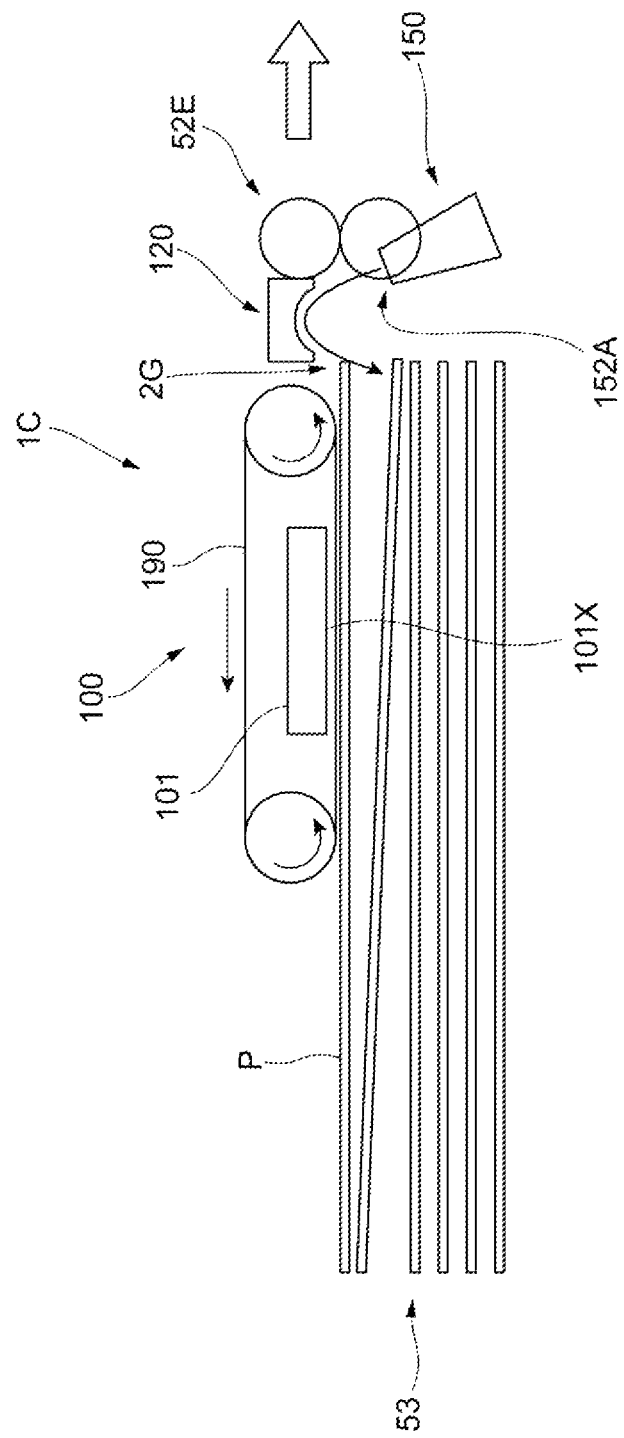
FIG. 10 is a view illustrating another example of the configuration of the paper feed-out unit.

In the configuration example illustrated in FIG. 10, the suction unit 100 is provided with the apparatus body 101 having the lower surface 101X and a belt member 190 that circularly moves.

The apparatus body 101 is disposed inside the belt member 190, and the belt member 190 is provided with plural through holes (not illustrated) that connect the inside and the outside of the belt member 190 to each other.

In this configuration example, when the paper P is suctioned by the apparatus body 101, the paper P adheres to the outer peripheral surface of the belt member 190. Here, in this configuration example, the surface that faces downward in the outer peripheral surface of the belt member 190 serves as the adsorption portion to which the paper P is adsorbed. Here, the adsorption portion is configured in a flat shape.

When the paper P adheres to the outer peripheral surface of the belt member 190, air is blown to the leading edge portion 2G of the paper P in the same manner as described above. Then, the rotation of the belt member 190 starts. As a result, the paper P is supplied to the most-upstream transport roller 52E.

Further, in this configuration example, the rotation of the belt member 190 starts after the blowing of air to the leading edge portion 2G is stopped or after the amount of the air blown to the leading edge portion 2G is reduced.

Additionally, in this configuration example, there is no functional unit that supports the leading edge portion 2G from above, similarly to the air guide member 120 illustrated in FIG. 5. Further, when the paper P passes through the position that faces the discharge port 152A (see FIG. 10), the paper P tends to flutter due to the air blown.

Thus, in this configuration example, when the paper P is moved toward the most-upstream transport roller 52E, the blowing of air is stopped, or the amount of the air blown is reduced.

Further, as another aspect, air may be blown to the leading end lateral side 510, directly from above.

In the descriptions above, the air from the air supply source 151 disposed below the lower surface 101X is first moved upward, and then, moved downward so that the air is blown to the leading end lateral side 510 from above. However, the blowing form is not limited thereto.

For example, an air supply source such as a fan may be provided above the lower surface 101X of the apparatus body 101, and air may be supplied to the leading end lateral side 510 directly from above. In this case, the recess 124 may be omitted.

Further, a case where the paper feeding apparatus 1B is provided in the image forming apparatus 1 has been described as an example. However, the paper feeding apparatus 1B may not be provided in the image forming apparatus 1, and may be provided in another apparatus that does not have the image forming function.

For example, the paper feeding apparatus 1B may be provided in an apparatus configured to handle papers that has already been printed, such as banknotes.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A paper feeding apparatus comprising:
   a paper feeder configured to feed out the uppermost paper included in a paper bundle;
   a blower configured to blow gas to a blowing target area of a lateral side of the paper bundle; and
   a processor configured to change a size of the blowing target area to which the gas is blown such that a vertical width of the blowing target area changes.

2. The paper feeding apparatus according to claim 1, wherein
   the processor is configured to, when papers included in the paper bundle satisfy a specific condition and/or when an environment of a place where the paper feeding apparatus is installed satisfies a predetermined specific condition, change the size of the blowing target area.

3. The paper feeding apparatus according to claim 2, wherein
   the processor is configured to, when a value specified by information about a thickness of the papers included in the paper bundle is smaller than a predetermined threshold and/or when a humidity of the place where the paper feeding apparatus is installed is lower than a predetermined threshold humidity, reduce the size of the blowing target area.

4. The paper feeding apparatus according to claim 1, wherein
   the blower comprises a guide surface configured to guide the gas blown to the lateral side, the guide surface being inclined to a flowing direction of the gas, and
   the processor is configured to change the size of the blowing target area by changing an amount of the gas that goes toward the guide surface.

5. The paper feeding apparatus according to claim 1, wherein
   the blower is configured to blow the gas to the blowing target area that extends vertically and that includes a portion where the uppermost paper included in the paper bundle is positioned, and the processor is configured to change the size of the blowing target area by changing a position of a lower end of the blowing target area.

6. The paper feeding apparatus according to claim 5, wherein the processor is configured to, when a value specified by information about a thickness of papers included in the paper bundle is smaller than a predetermined threshold and/or when a humidity of a place where the paper feeding apparatus is installed is lower than a predetermined threshold humidity, move the position of the lower end of the blowing target area upward so as to reduce the size of the blowing target area.

7. A paper feeding apparatus comprising:

a paper feeder configured to feed out the uppermost paper included in a paper bundle; and a blower configured to blow gas to a lateral side of the paper bundle, the blower being configured to blow the gas to a guide surface that guides and changes the direction of the gas to go toward the lateral side, wherein:

a position of the guide surface with respect to the paper bundle can be changed, the guide surface is disposed above the paper bundle in a state of facing toward the paper bundle, and the paper feeding apparatus is configured to enter at least two states that comprise a first state where a portion of the paper bundle is disposed at a position that faces the guide surface, and a second state where the paper bundle is not disposed at the position that faces the guide surface.

8. The paper feeding apparatus according to claim 7, wherein the guide surface is convex upward and has a curvature, the guide surface comprises one end and another end, and the gas flows along the guide surface from the one end toward the other end, and then, is blown away from the guide surface toward the lateral side.

9. The paper feeding apparatus according to claim 7, further comprising:

a processor configured to change the position of the guide surface with respect to the paper bundle, wherein the processor is configured to, when an environment of a place where the paper feeding apparatus is installed satisfies a predetermined specific condition, change the position of the guide surface with respect to the paper bundle.

\* \* \* \* \*